US012803195B2

(12) United States Patent
Hashiguchi

(10) Patent No.: US 12,803,195 B2
(45) Date of Patent: Nov. 17, 2026

(54) CONNECTOR AND CONNECTOR ASSEMBLY

(71) Applicant: Japan Aviation Electronics Industry, Limited, Tokyo (JP)

(72) Inventor: Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 572 days.

(21) Appl. No.: 18/453,637

(22) Filed: Aug. 22, 2023

(65) Prior Publication Data

US 2024/0145955 A1 May 2, 2024

(30) Foreign Application Priority Data

Oct. 31, 2022 (JP) ................................ 2022-174356

(51) Int. Cl.
*H01R 12/65* (2011.01)
*H01R 12/63* (2011.01)

(52) U.S. Cl.
CPC ............ *H01R 12/65* (2013.01); *H01R 12/63* (2013.01)

(58) Field of Classification Search
CPC ...... H01R 12/65; H01R 12/63; H01R 4/5066; H01R 12/69; H01R 12/7011; H01R 12/613; H01R 13/639; H01R 13/02; H01R 13/502
See application file for complete search history.

(56) References Cited

U.S. PATENT DOCUMENTS

| | | | | |
|---|---|---|---|---|
| 4,784,615 A * | 11/1988 | Teng-Hong | H01R 12/61 | 439/496 |
| 5,885,091 A * | 3/1999 | Belanger, Jr. | H05K 3/326 | 439/67 |
| 10,483,668 B2 * | 11/2019 | Hashiguchi | H05K 1/147 | |
| 10,630,009 B2 * | 4/2020 | Hashiguchi | H01R 12/613 | |
| 2007/0224878 A1 * | 9/2007 | Kao | H05K 3/365 | 439/496 |
| 2021/0057838 A1 | 2/2021 | Komoto et al. | | |
| 2021/0104824 A1 * | 4/2021 | Hashiguchi | A44C 5/14 | |
| 2021/0126393 A1 | 4/2021 | Hashiguchi | | |
| 2024/0283172 A1 * | 8/2024 | Komoto | H01R 9/2416 | |

FOREIGN PATENT DOCUMENTS

| | | |
|---|---|---|
| JP | 52-147261 U | 11/1977 |
| JP | 2007214087 A | 8/2007 |
| JP | 2021034208 A | 3/2021 |

* cited by examiner

*Primary Examiner* — Travis S Chambers
(74) *Attorney, Agent, or Firm* — Muncy, Geissler, Olds & Lowe, P.C.

(57) ABSTRACT

A connector includes a first insulator having a protrusion portion formed on a first retaining surface, a second insulator having a recess portion formed at a second retaining surface, and a spring member retained in one of the first insulator and the second insulator, the spring member being disposed between the protrusion portion and the recess portion and has a pressing portion that is elastically displaceable in a first direction, a sheet type conductive member and an electric wire being sandwiched between the first retaining surface and the second retaining surface, at least a part of the protrusion portion being accommodated in the recess portion, a conductor portion of the electric wire and a flexible conductor of the sheet type conductive member being pressed against each other in the first direction by the pressing portion within the recess portion.

13 Claims, 20 Drawing Sheets

CONNECTOR AND CONNECTOR ASSEMBLY

BACKGROUND OF THE INVENTION

The present invention relates to a connector, particularly to a connector connecting a conductor portion of an electric wire to a flexible conductor of a sheet type conductive member.

The present invention also relates to a connector assembly in which a conductor portion of an electric wire is connected to a flexible conductor of a sheet type conductive member by means of the connector.

In recent years, attention has been drawn to so-called smart clothes that can obtain user's biological data such as the heart rate and the body temperature only by being worn by the user. Such smart clothes have an electrode disposed at a measurement site and constituted of a flexible conductor, and when a wearable device serving as a measurement device is electrically connected to the electrode, biological data can be transmitted to the wearable device.

The electrode and the wearable device can be interconnected by, for instance, use of a connector connected to the flexible conductor.

However, when the wearable device is situated away from the measurement site, it is necessary to provide an electric circuit connecting the electrode disposed at the measurement site to the place where the connector is attached, and if such an electric circuit is formed from a flexible conductor, this causes higher electric resistance and higher cost.

To connect an electrode constituted of a flexible conductor to a wearable device by use of an electric wire that has low electric resistance and is inexpensive, it has been desired to develop a small-sized connector connecting the electric wire to the flexible conductor disposed on a garment.

For instance, JP 2007-214087 A discloses a connector shown in FIG. 50 as a connector used for connecting an electric wire to a flexible conductor. This connector includes: a first connector 2 connected to an end of a sheet type conductive member 1; and a second connector 4 attached to tips of electric wires 3. The electric wires 3 can be connected to a flexible conductor of the sheet type conductive member 1 by fitting the second connector 4 to the first connector 2.

However, the first connector 2 and the second connector 4 to be fitted together are required to connect the electric wires 3 to the flexible conductor of the sheet type conductive member 1, and this causes a larger size of a device; and there is a separatable connection portion between the first connector 2 and the second connector 4, which impairs the reliability of electric connection.

SUMMARY OF THE INVENTION

The present invention has been made to solve the conventional problem described above and aims at providing a connector and a connector assembly that can be smaller in size while reliably connecting a conductor portion of an electric wire to a flexible conductor of a sheet type conductive member.

A connector according to the present invention is one connecting a conductor portion of an electric wire to a flexible conductor exposed on at least one surface of a sheet type conductive member, the connector comprising:

a first insulator including a first retaining surface and a protrusion portion formed on the first retaining surface to protrude;

a second insulator including a second retaining surface that faces the first retaining surface and a recess portion that is formed at the second retaining surface and corresponds to the protrusion portion; and a spring member retained in one of the first insulator and the second insulator, wherein the spring member is disposed between the protrusion portion and the recess portion and has a pressing portion that is elastically displaceable in a first direction along the first retaining surface and the second retaining surface, the sheet type conductive member and the electric wire are sandwiched between the first retaining surface and the second retaining surface, and at least a part of the protrusion portion is accommodated in the recess portion, and the conductor portion of the electric wire and the flexible conductor of the sheet type conductive member are pressed against each other in the first direction by the pressing portion within the recess portion, so that the conductor portion of the electric wire is electrically connected to the flexible conductor of the sheet type conductive member.

A connector assembly according to the present invention comprises:

the sheet type conductive member;

the electric wire; and the above-mentioned connector connected to the sheet type conductive member and the electric wire, wherein the sheet type conductive member includes an opening through which the protrusion portion of the first insulator passes and a projection portion projecting from an edge of the opening toward an inside of the opening, the flexible conductor being exposed on the projection portion, and the projection portion and the conductor portion of the electric wire are pressed against each other in the first direction by the pressing portion within the recess portion.

DETAILED DESCRIPTION OF THE INVENTION

Embodiments of the present invention are described below based on the accompanying drawings.

Embodiment 1

Figure 1:
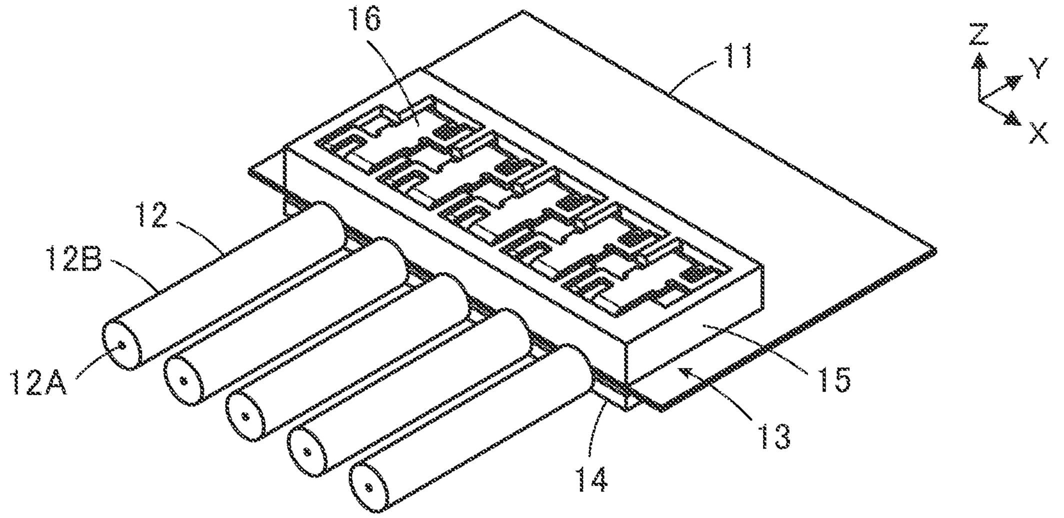
FIG. 1 is a perspective view showing a connector according to Embodiment 1.
Figure 2:
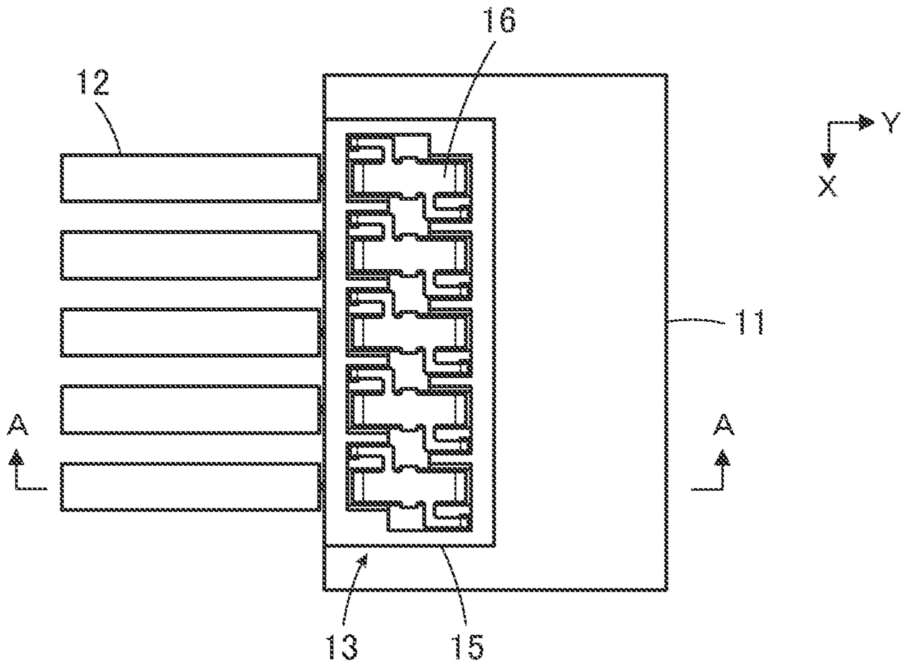
FIG. 2 is a plan view showing the connector according to Embodiment 1.

FIGS. 1 and 2 show a connector according to Embodiment 1. The connector is used for connecting, to a sheet type conductive member 11, a plurality of coated electric wires 12 extending in parallel and includes a housing 13 made of an insulating resin material.

Each coated electric wire 12 has a structure in which the outer periphery of a conductor portion 12A is covered with an insulating coating portion 12B.

The housing 13 is composed of a first insulator 14 and a second insulator 15, and the sheet type conductive member 11 is disposed between the first insulator 14 and the second insulator 15.

A plurality of spring members 16 corresponding to the coated electric wires 12 are incorporated in the second insulator 15.

For convenience, the sheet type conductive member 11 is defined as extending in an XY plane, the direction in which the coated electric wires 12 extend toward the housing 13 is called "+Y direction," the alignment direction of the coated electric wires 12 "X direction," and the direction from the first insulator 14 to the second insulator 15 "+Z direction."

The first insulator 14 is disposed on the −Z direction side of the sheet type conductive member 11, and the second insulator 15 is disposed on the +Z direction side of the sheet type conductive member 11.

Figure 3:
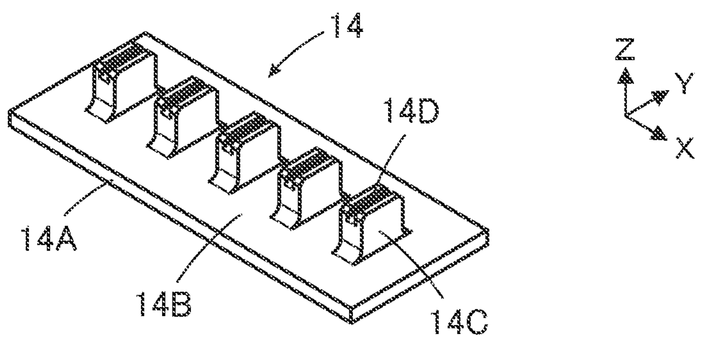
FIG. 3 is a perspective view showing a first insulator used in the connector according to Embodiment 1.

FIG. 3 shows the structure of the first insulator 14. The first insulator 14 has a rectangular flat plate portion 14A extending along an XY plane. The top surface of the flat plate portion 14A on the +Z direction side forms a first retaining surface 14B, and a plurality of protrusion portions

14C in a prismatic shape are formed on the first retaining surface 14B to protrude in the +Z direction.

The protrusion portions 14C are aligned in the X direction at a predetermined pitch. Each protrusion portion 14C is provided at its top facing the +Z direction with an electric wire accommodating groove 14D traversing the protrusion portion 14C in the Y direction. The electric wire accommodating groove 14D is used for accommodating the conductor portion 12A drawn from the coated electric wire 12 and has a groove width slightly larger than the diameter of the conductor portion 12A.

Figure 4:
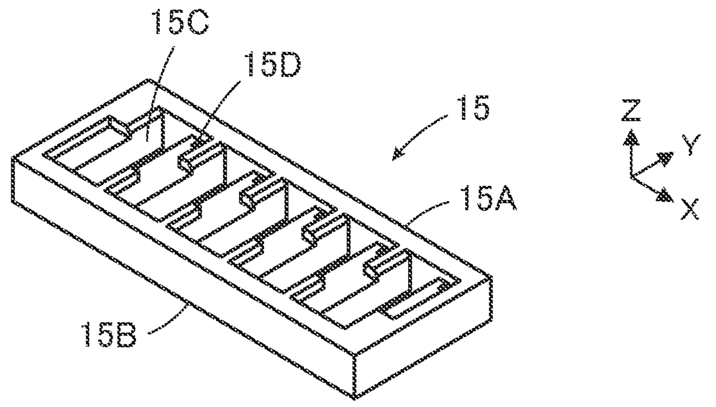
FIG. 4 is a perspective view showing a second insulator used in the connector according to Embodiment 1.

FIG. 4 shows the structure of the second insulator 15. The second insulator 15 has a main body 15A in a rectangular, thick flat plate shape. The bottom surface of the main body 15A on the −Z direction side forms a second retaining surface 15B. The main body 15A is provided with a plurality of rectangular through-holes 15C penetrating the main body 15A in the Z direction from the top surface of the main body 15A on the +Z direction side to the second retaining surface 15B on the −Z direction side. The through-holes 15C constitute recess portions formed at the second retaining surface 15B. The through-holes 15C may be replaced by recess portions having bottom surfaces depressed toward the +Z direction from the second retaining surface 15B on the −Z direction side of the main body 15A.

The through-holes 15C are aligned in the X direction at the same pitch as that of the protrusion portions 14C of the first insulator 14, and corners of each through-hole 15C are provided with press-fitting holes 15D used to hold the corresponding spring member 16. While only one press-fitting hole 15D is shown for each through-hole 15C in FIG. 4, press-fitting holes 15D are formed separately at a pair of corners situated on one diagonal line of each through-hole 15C.

Figure 5:
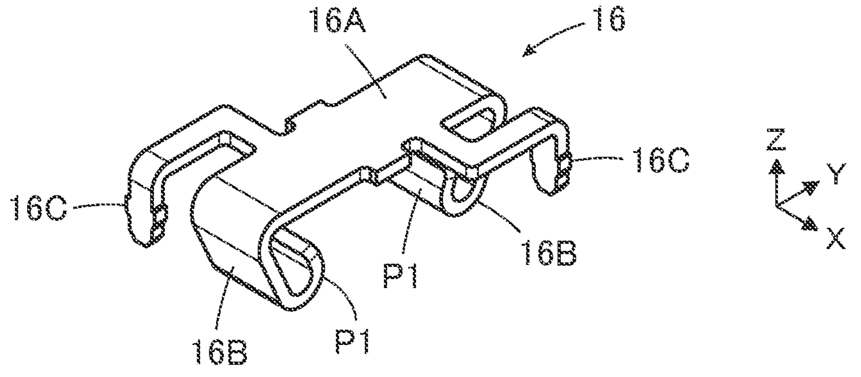
FIG. 5 is a perspective view showing a spring member used in the connector according to Embodiment 1.

FIG. 5 shows the structure of the spring member 16. The spring member 16 is formed from a bent metal plate and includes a flat plate portion 16A extending in the Y direction along an XY plane and a pair of arm portions 16B extending in the −Z direction separately from the opposite ends, in the Y direction, of the flat plate portion 16A. The −Z directional ends of the pair of arm portions 16B are curved inward to approach and face each other. The curved portions of the pair of arm portions 16B form a pair of pressing portions P1 that are elastically displaceable in the Y direction (first direction).

The flat plate portion 16A is joined with a pair of press-fitting portions 16C that extend from the opposite edges, in the X direction, of the flat plate portion 16A up to positions adjacent to a pair of corners situated on one diagonal line of the flat plate portion 16A and that are bent toward the −Z direction.

When the spring member 16 is pushed into the corresponding through-hole 15C of the second insulator 15 from the +Z direction, the pair of press-fitting portions 16C of the spring member 16 are press-fitted into the pair of press-fitting holes 15D of the through-hole 15C, whereby the spring member 16 can be incorporated into the through-hole 15C.

Figure 6:
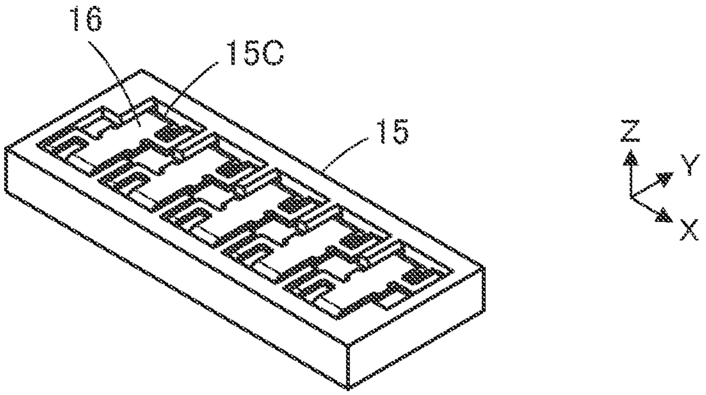
FIG. 6 is a perspective view showing the second insulator having spring members incorporated therein in Embodiment 1.

Thus, the plurality of spring members 16 are incorporated into the second insulator 15 as shown in FIG. 6.

Figure 7:
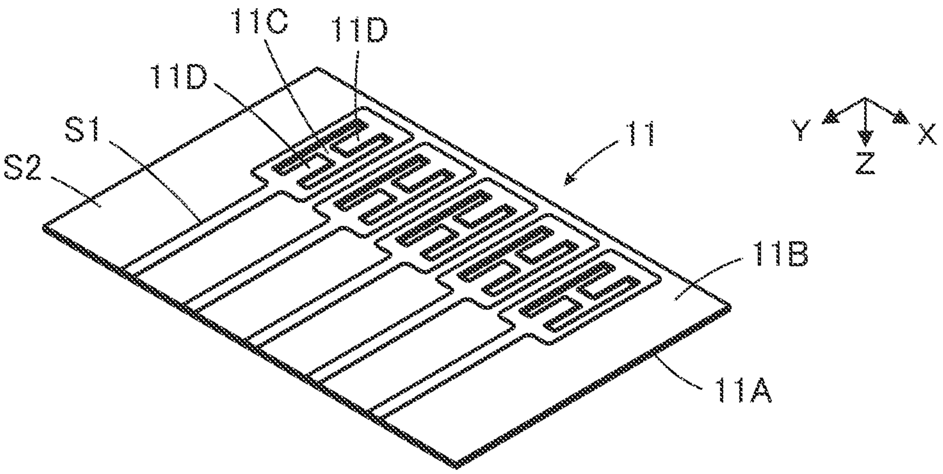
FIG. 7 is a perspective view of a sheet type conductive member used in the connector according to Embodiment 1, as viewed from an obliquely lower position.

FIG. 7 shows the structure of the sheet type conductive member 11. The sheet type conductive member 11 has a top surface 11A facing the +Z direction and a bottom surface 11B facing the −Z direction, and flexible conductors S1 are exposed on the bottom surface 11B. The sheet type conductive member 11 is provided with a plurality of H-shaped openings 11C. A pair of projection portions 11D are formed to project from the opposite edges, in the Y direction, of each opening 11C toward the inside of the opening 11C and face each other in the Y direction.

The openings 11C are aligned in the X direction at the same pitch as that of the protrusion portions 14C of the first insulator 14 and the through-holes 15C of the second insulator 15.

Figure 8:
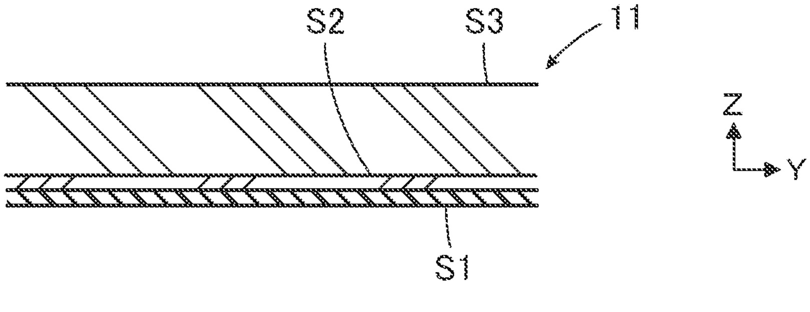
FIG. 8 is a partial cross-sectional view showing the sheet type conductive member used in the connector according to Embodiment 1.

As shown in FIG. 8, the sheet type conductive member 11 has a three-layer structure in which the flexible conductor S1, an insulating sheet S2 retaining the flexible conductor S1, and a reinforcing plate S3 reinforcing the insulating sheet S2 are stacked in the Z direction. The reinforcing plate S3 may be formed from an insulating material or a conductive material.

Parts of the flexible conductor S1 are exposed on the pair of projection portions 11D on the bottom surface 11B, facing the −Z direction, of the sheet type conductive member 11 shown in FIG. 7, and those parts of the flexible conductor S1 of the pair of projection portions 11D are integral with another part of the flexible conductor S1 disposed along the periphery of the opening 11C and thereby electrically connected to each other.

On the bottom surface 11B of the sheet type conductive member 11, the insulating sheet S2 is exposed in the other regions than the regions where the flexible conductors S1 are exposed.

Figure 9:
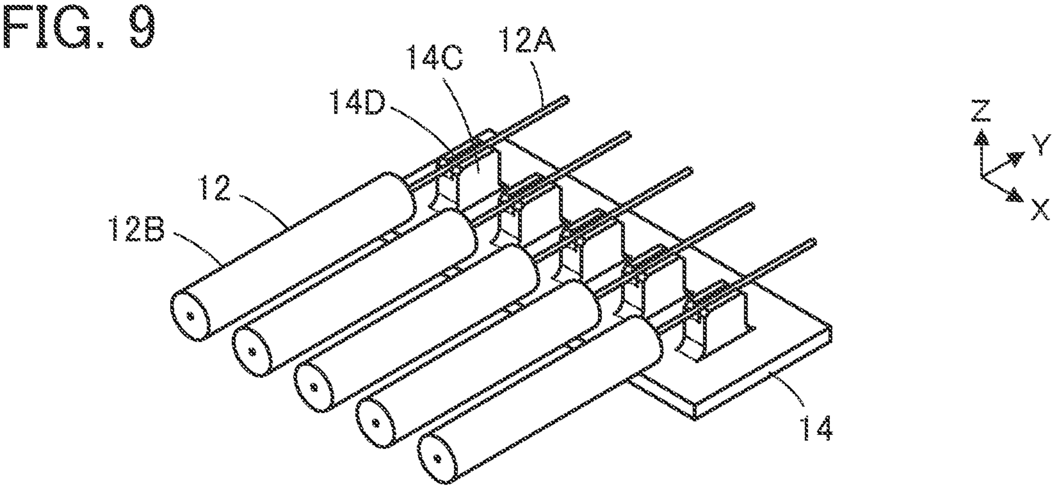
FIG. 9 is a perspective view showing the first insulator on which electric wires are disposed in Embodiment 1.

In assembly of the connector according to Embodiment 1, first, the conductor portions 12A drawn from the insulating coating portions 12B of the coated electric wires 12 are accommodated separately in the electric wire accommodating grooves 14D formed in the tops of the protrusion portions 14C of the first insulator 14 as shown in FIG. 9. At this time, intermediate portions of the conductor portions 12A are accommodated in the electric wire accommodating grooves 14D of the protrusion portions 14C such that the tips of the respective conductor portions 12A protrude beyond the corresponding protrusion portions 14C on the +Y direction side.

Figure 10:
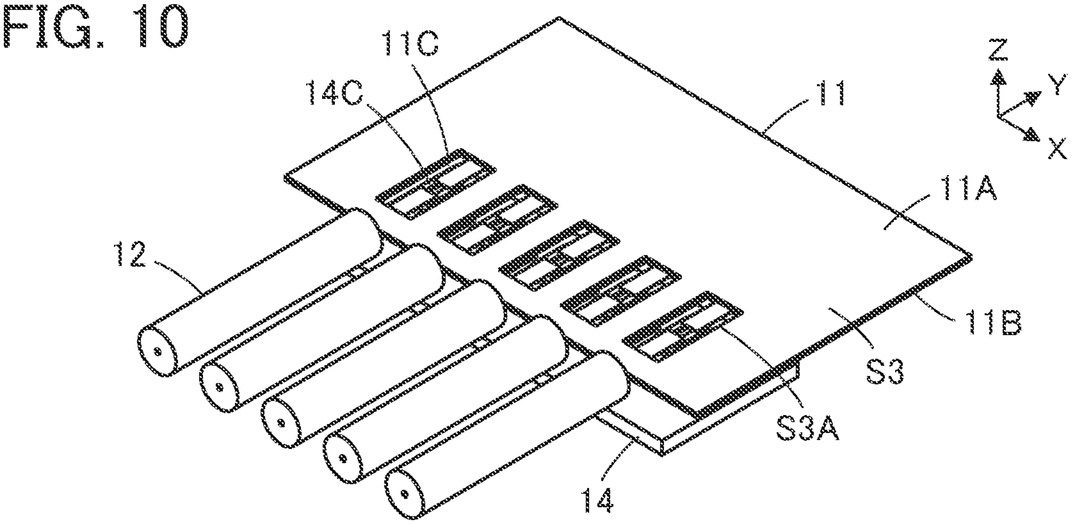
FIG. 10 is a perspective view showing the first insulator on which the electric wires and the sheet type conductive member are disposed in Embodiment 1.

Next, as shown in FIG. 10, the sheet type conductive member 11 is disposed on the first insulator 14 from the +Z direction. The sheet type conductive member 11 is positioned such that the bottom surface 11B on which the flexible conductors S1 are exposed faces the first insulator 14 and that the openings 11C overlap over the protrusion portions 14C of the first insulator 14. The reinforcing plate S3 is exposed on the top surface 11A, facing the +Z direction, of the sheet type conductive member 11. The reinforcing plate S3 is provided with a plurality of rectangular openings S3A corresponding to the H-shaped openings 11C.

Figure 11:
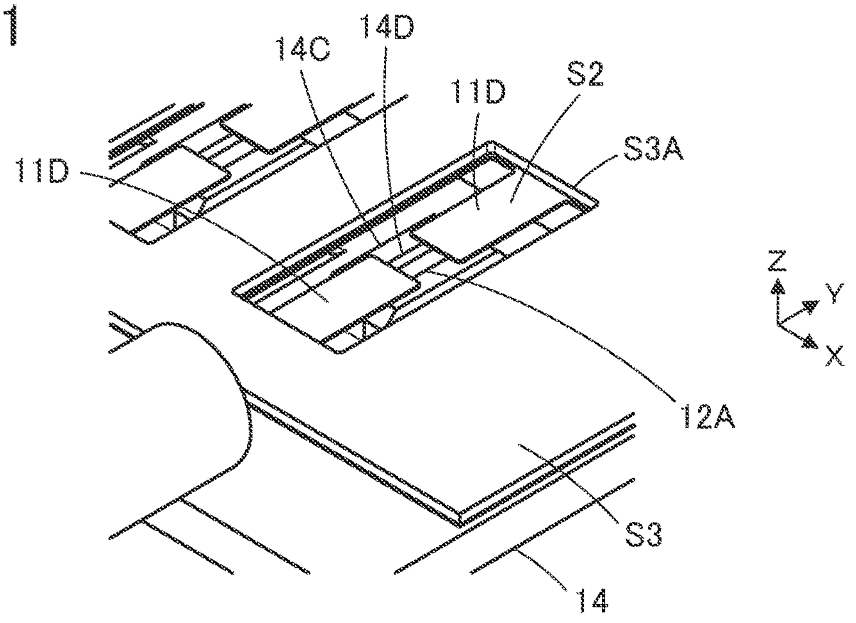
FIG. 11 is an enlarged view of a main part of FIG. 10.

As shown in FIG. 11, the pair of projection portions 11D extending in the Y direction and facing each other in the Y direction are seen within the opening S3A of the reinforcing plate S3. The projection portions 11D have a two-layer structure composed of the insulating sheet S2 and the flexible conductor S1 stacked on the −Z direction side of the insulating sheet S2 and make contact with the conductor portion 12A accommodated in the electric wire accommodating groove 14D of the corresponding protrusion portion 14C of the first insulator 14.

Figure 12:
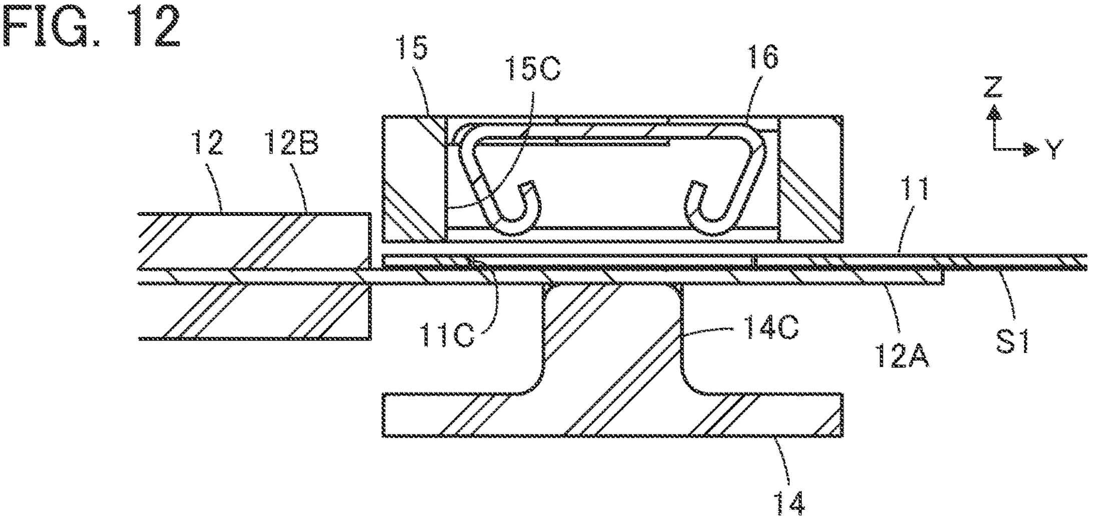
FIG. 12 is a cross-sectional view showing the connector according to Embodiment 1 immediately before being assembled.

Further, the second insulator 15 in which the spring members 16 are incorporated is disposed on the +Z direction side of the sheet type conductive member 11 as shown in FIG. 12. At this time, the second insulator 15 is positioned such that the spring members 16 incorporated separately in the through-holes 15C are situated on the +Z direction side of the corresponding openings 11C of the sheet type conductive member 11.

Figure 13:
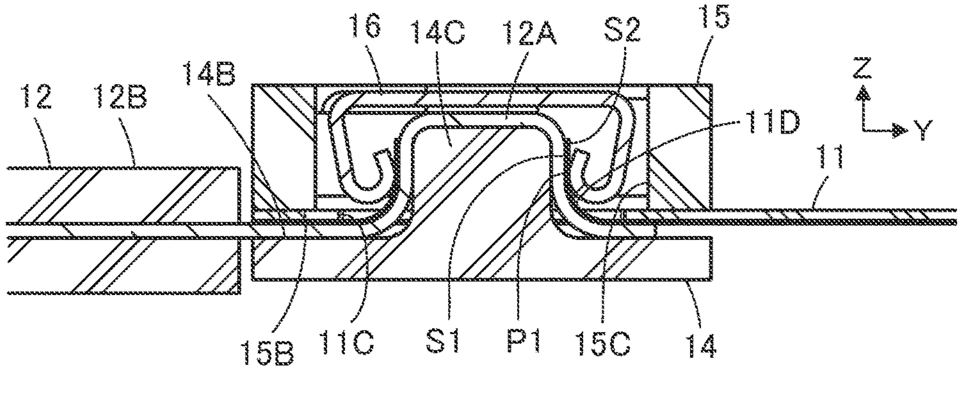
FIG. 13 is a cross-sectional view taken along line A-A in FIG. 2.

In this state, the first insulator 14 and the second insulator 15 are pressed against each other in the Z direction, whereby the protrusion portion 14C of the first insulator 14 is accommodated in the through-hole 15C of the second insulator 15 along the Z direction (second direction) as shown in FIG. 13.

Since the spring member 16 is incorporated in the through-hole 15C of the second insulator 15, the protrusion portion 14C of the first insulator 14 passes through the opening 11C of the sheet type conductive member 11 while pushing the conductor portion 12A drawn from the insulating coating portion 12B of the coated electric wire 12 and the pair of projection portions 11D of the sheet type conductive member 11, and is inserted between the pair of pressing portions P1 of the spring member 16.

In addition, the sheet type conductive member 11 and the conductor portion 12A are sandwiched between the first retaining surface 14B of the first insulator 14 and the second retaining surface 15B of the second insulator 15.

The assembling operation of the connector is thus completed.

By the protrusion portion 14C of the first insulator 14 being inserted between the pair of pressing portions P1 of the spring member 16 from the −Z direction, the conductor portion 12A of the coated electric wire 12 and the projection portions 11D of the sheet type conductive member 11 that have been pushed and inserted along with the protrusion portion 14C are bent along lateral surfaces of the protrusion portion 14C and pressed against the lateral surfaces of the protrusion portion 14C in the Y direction by the pressing portions P1 of the spring member 16 on the opposite sides, in the Y direction, of the protrusion portion 14C. Since the projection portions 11D are formed from the insulating sheet S2 and the flexible conductor S1 stacked on the −Z direction side of the insulating sheet S2, the flexible conductor S1 of the projection portions 11D being bent makes contact with and is electrically connected to the conductor portion 12A of the coated electric wire 12 with a predetermined contact pressure.

In the connector according to Embodiment 1, the conductor portion 12A of the coated electric wire 12 and the projection portions 11D of the sheet type conductive member 11 that have been, along with the protrusion portion 14C of the first insulator 14, pushed in the through-hole 15C of the second insulator 15 are pressed against the lateral surfaces of the protrusion portion 14C by the pressing portions P1 of the spring member 16, whereby the conductor portion 12A of the coated electric wire 12 is electrically connected to the flexible conductor S1 of the sheet type conductive member 11. This configuration allows the connector to have a smaller size while improving the reliability of electric connection between the flexible conductor S1 and the conductor portion 12A.

Besides, elastic forces acting from the pressing portions P1 of the spring member 16 to the conductor portion 12A of the coated electric wire 12 and the projection portions 11D of the sheet type conductive member 11 are oriented in the Y direction (first direction) perpendicular to the Z direction (second direction) in which the protrusion portion 14C of the first insulator 14 is accommodated in the through-hole 15C of the second insulator 15, and further, oppositely-oriented elastic forces along the Y direction act from the pressing portions P1 of the spring member 16 on the opposite sides, in the Y direction, of the protrusion portion 14C. Owing to this configuration, the first insulator 14 is prevented from coming off the second insulator 15 in the Z direction even when the elastic forces act, thus obtaining a stable electric connection.

When the connector of Embodiment 1 is applied to smart clothes and an electrode (not shown) is connected to the flexible conductor S1 of the sheet type conductive member 11, the electrode disposed at a measurement site can be connected to a wearable device by use of the coated electric wire 12 that has low electric resistance and is inexpensive.

The first insulator 14 and the second insulator 15 may be fixed together by known means such as fitting, screwing, or adhering.

Embodiment 2

Figure 14:
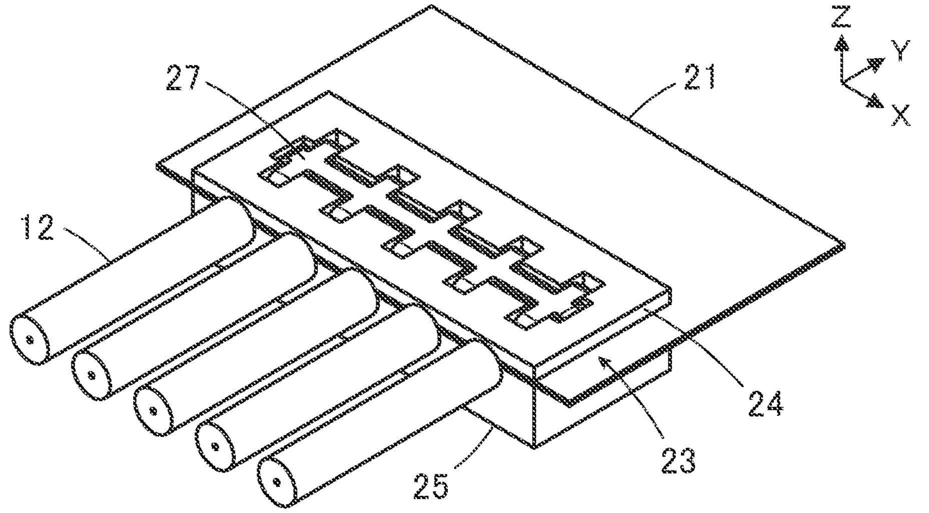
FIG. 14 is a perspective view showing a connector according to Embodiment 2.
Figure 15:
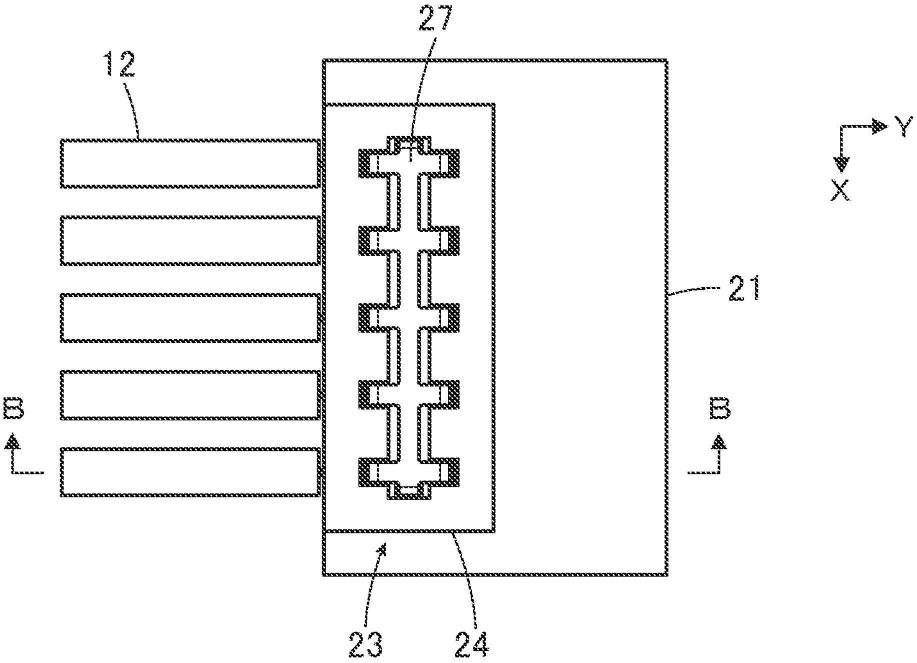
FIG. 15 is a plan view showing the connector according to Embodiment 2.

FIGS. 14 and 15 show a connector according to Embodiment 2. The connector is used for connecting the plurality of coated electric wires 12 to a sheet type conductive member 21 and includes a housing 23 made of an insulating resin material.

The coated electric wires 12 herein are the same as the coated electric wires 12 used in Embodiment 1.

The housing 23 is composed of a first insulator 24 and a second insulator 25. The first insulator 24 is disposed on the +Z direction side of the sheet type conductive member 21, and the second insulator 25 is disposed on the −Z direction side of the sheet type conductive member 21.

An elastic member 27 is incorporated in the first insulator 24.

Figure 16:
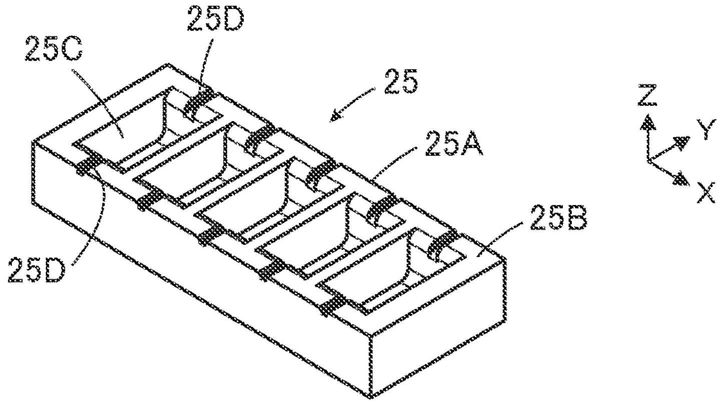
FIG. 16 is a perspective view showing a second insulator used in the connector according to Embodiment 2.

FIG. 16 shows the structure of the second insulator 25. The second insulator 25 has a main body 25A in a rectangular, thick flat plate shape. The surface of the main body 25A on the +Z direction side forms a second retaining surface 25B. The main body 25A is provided with a plurality of rectangular recess portions 25C recessed in the −Z direction from the second retaining surface 25B. The recess portions 25C may be replaced by through-holes penetrating the main body 25A in the Z direction from the second retaining surface 25B of the main body 25A to the opposite surface on the −Z direction side.

The recess portions 25C are aligned in the X direction at a predetermined pitch. The second retaining surface 25B is provided with electric wire accommodating grooves 25D traversing the second retaining surface 25B in the Y direction on the opposite sides, in the Y direction, of each recess portion 25C. The electric wire accommodating groove 25D is used for accommodating the conductor portion 12A drawn from the coated electric wire 12 and has a groove width slightly larger than the diameter of the conductor portion 12A.

Figure 17:
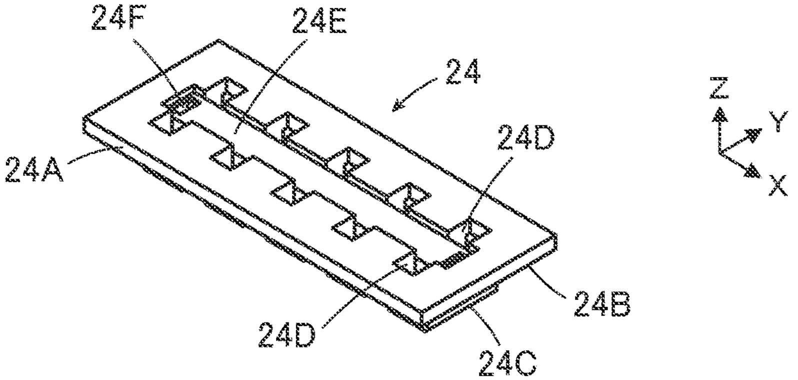
FIG. 17 is a perspective view showing a first insulator used in the connector according to Embodiment 2.

FIG. 17 shows the structure of the first insulator 24. The first insulator 24 has a rectangular flat plate portion 24A extending along an XY plane. The bottom surface of the flat plate portion 24A on the −Z direction side forms a first retaining surface 24B, and a plurality of protrusion portions 24C in a prismatic shape are formed on the first retaining surface 24B to protrude in the −Z direction. The protrusion portions 24C are aligned in the X direction at the same pitch as that of the recess portions 25C of the second insulator 25.

Arm portion accommodating holes 24D are formed on the opposite sides, in the Y direction, of each protrusion portion 24C to penetrate the flat plate portion 24A in the Z direction and open toward the +Z direction.

Further, one step portion 24E extending in the X direction is formed at the surface of the flat plate portion 24E on the +Z direction side, and the respective arm accommodating holes 24D are connected to the step portion 24E. A pair of press-fitting holes 24F are formed on the opposite ends, in the X direction, of the step portion 24E to retain the elastic member 27.

Figure 18:
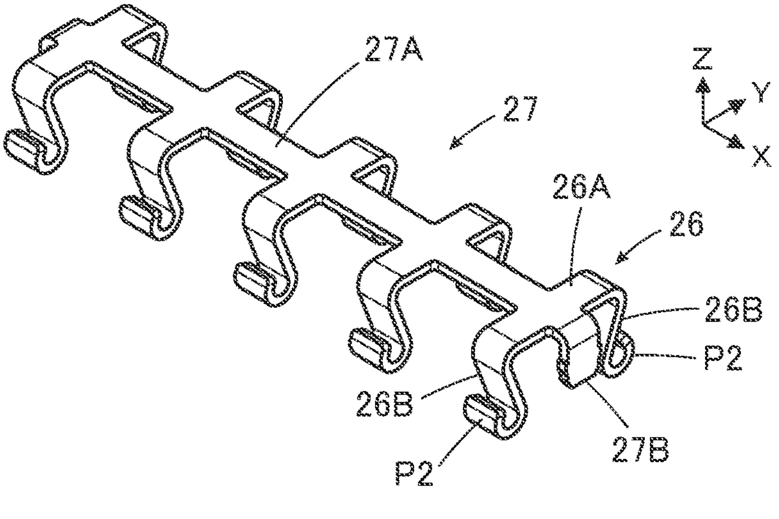
FIG. 18 is a perspective view showing an elastic member used in the connector according to Embodiment 2.

FIG. 18 shows the structure of the elastic member 27. The elastic member 27 is formed from a bent metal plate and has the structure in which a plurality of spring members 26 are joined to a linking portion 27A extending in the X direction. The spring members 26 are aligned in the X direction at the same pitch as that of the recess portions 25C of the second insulator 25 and the protrusion portions 24C of the first insulator 24. Each spring member 26 includes a flat plate portion 26A extending in the Y direction along an XY plane and a pair of arm portions 26B extending in the −Z direction separately from the opposite ends, in the Y direction, of the flat plate portion 26A. The −Z directional ends of the pair of arm portions 26B are curved outward to face the opposite directions from each other. The curved portions of the pair of arm portions 26B form a pair of pressing portions P2 that are elastically displaceable in the Y direction (first direction).

In addition, a pair of press-fitting portions 27B extending in the −Z direction are formed on the opposite ends, in the X direction, of the linking portion 27A.

Figure 19:
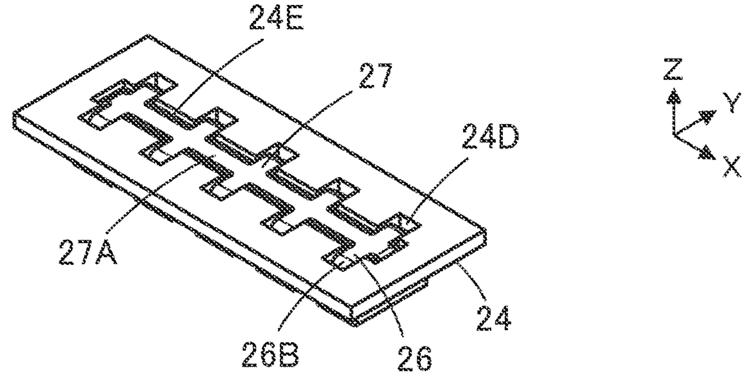
FIG. 19 is a perspective view showing the first insulator having the elastic member incorporated therein in Embodiment 2.

When the elastic member 27 is pushed toward the first insulator 24 from the +Z direction, the pair of press-fitting portions 27B of the elastic member 27 are press-fitted into the pair of press-fitting holes 24F of the first insulator 24, whereby the elastic member 27 can be incorporated into the first insulator 24 as shown in FIG. 19.

At this time, the linking portion 27A of the elastic member 27 is accommodated in the step portion 24E of the first insulator 24, and the arm portions 26B of the spring members 26 are accommodated in the corresponding arm accommodating holes 24D of the first insulator 24.

Figure 20:
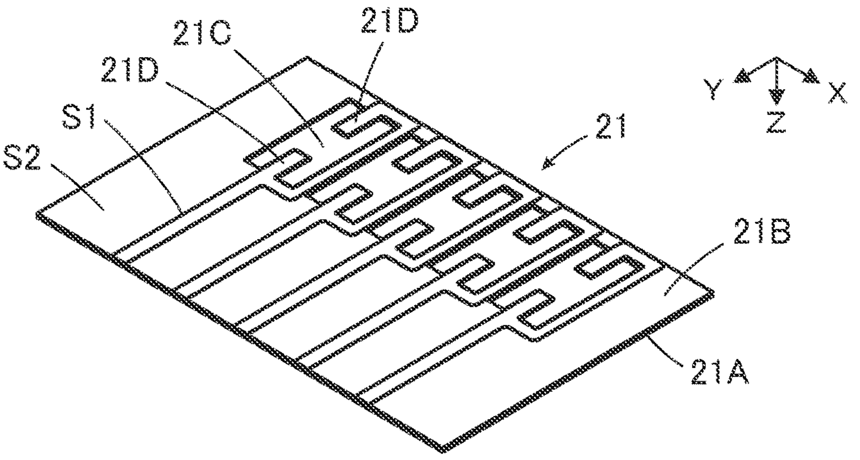
FIG. 20 is a perspective view of a sheet type conductive member used in the connector according to Embodiment 2, as viewed from an obliquely lower position.

FIG. 20 shows the structure of the sheet type conductive member 21. The sheet type conductive member 21 has a top surface 21A facing the +Z direction and a bottom surface 21B facing the −Z direction, and flexible conductors S1 are exposed on the bottom surface 21B. The sheet type conductive member 21 is provided with a plurality of H-shaped openings 21C. A pair of projection portions 21D are formed to project from the opposite edges, in the Y direction, of each opening 21C toward the inside of the opening 21C and face each other in the Y direction.

The openings 21C are aligned in the X direction at the same pitch as that of the recess portions 25C of the second insulator 25, the protrusion portions 24C of the first insulator 24, and the spring members 26 of the elastic member 27.

As with the sheet type conductive member 11 used in Embodiment 1, the sheet type conductive member 21 has a three-layer structure in which the flexible conductor S1, the insulating sheet S2 retaining the flexible conductor S1, and the reinforcing plate S3 reinforcing the insulating sheet S2 are stacked in the Z direction as shown in FIG. 8.

Parts of the flexible conductor S1 are exposed on the pair of projection portions 21D on the bottom surface 21B, facing the −Z direction, of the sheet type conductive member 21 shown in FIG. 20, and those parts of the flexible conductor S1 of the pair of projection portions 21D are integral with another part of the flexible conductor S1 disposed along a lateral portion of the opening 21C and thereby electrically connected to each other.

On the bottom surface 21B of the sheet type conductive member 21, the insulating sheet S2 is exposed in the other regions than the regions where the flexible conductors S1 are exposed.

Figure 21:
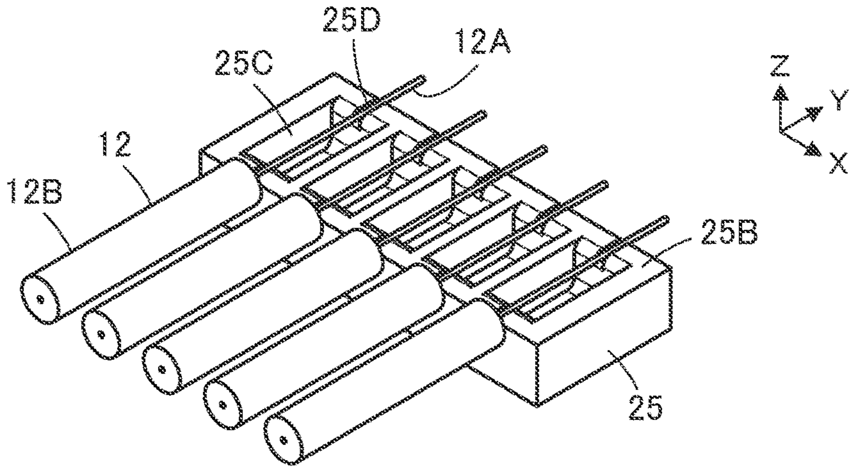
FIG. 21 is a perspective view showing the second insulator on which electric wires are disposed in Embodiment 2.

In assembly of the connector according to Embodiment 2, first, the conductor portions 12A drawn from the insulating coating portions 12B of the coated electric wires 12 are accommodated separately in the electric wire accommodating grooves 25D formed at the second retaining surface 25B on the opposite sides, in the Y direction, of the respective recess portions 25C of the second insulator 25 as shown in FIG. 21. At this time, intermediate portions of the conductor portions 12A are accommodated in the electric wire accommodating grooves 25D such that the tips of the respective conductor portions 12A protrude beyond the corresponding recess portions 25C on the +Y direction side, and the conductor portions 12A each traverse the +Z direction side of the corresponding recess portion 25C in the Y direction.

Figure 22:
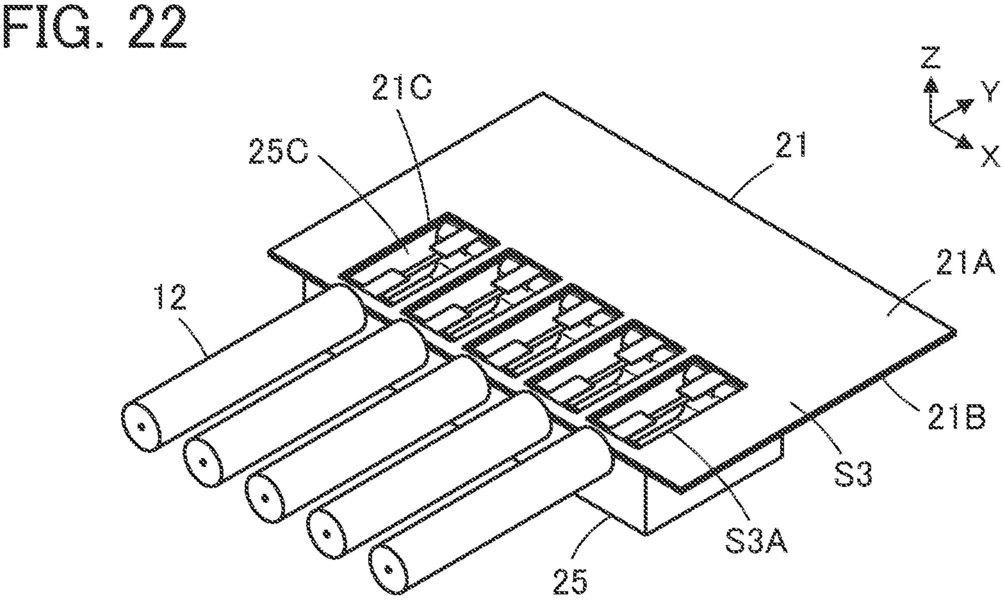
FIG. 22 is a perspective view showing the second insulator on which the electric wires and the sheet type conductive member are disposed in Embodiment 2.

Next, as shown in FIG. 22, the sheet type conductive member 21 is disposed on the second insulator 25 from the +Z direction. The sheet type conductive member 21 is positioned such that the bottom surface 21B on which the flexible conductors S1 are exposed faces the second insulator 25 and that the openings 21C overlap over the recess portions 25C of the second insulator 25. The reinforcing plate S3 is exposed on the top surface 21A, facing the +Z direction, of the sheet type conductive member 21. The reinforcing plate S3 is provided with a plurality of rectangular openings S3A corresponding to the H-shaped openings 21C.

Figure 23:
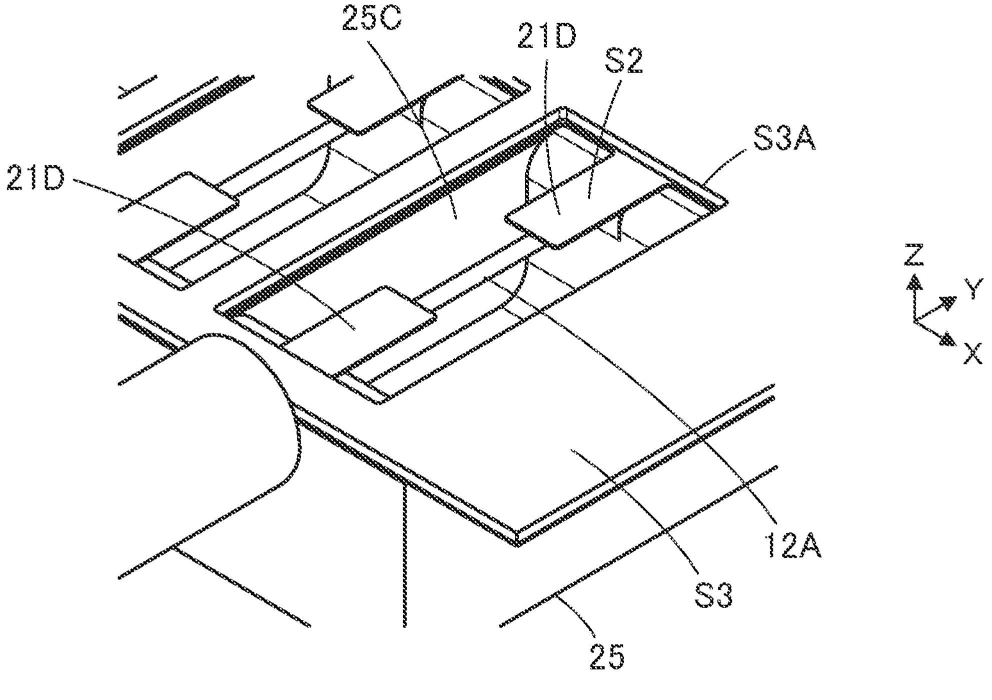
FIG. 23 is an enlarged view of a main part of FIG. 22.

As shown in FIG. 23, the pair of projection portions 21D extending in the Y direction and facing each other in the Y direction are seen within the opening S3A of the reinforcing plate S3. The projection portions 21D have a two-layer structure composed of the insulating sheet S2 and the flexible conductor S1 stacked on the −Z direction side of the insulating sheet S2 and make contact with the conductor portion 12A traversing the corresponding recess portion 25C of the second insulator 25 in the Y direction.

Figure 24:
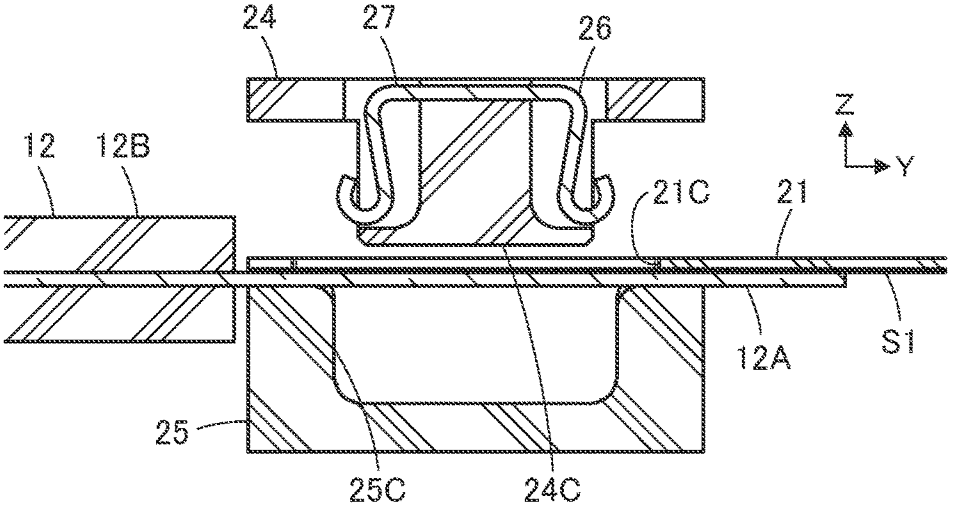
FIG. 24 is a cross-sectional view showing the connector according to Embodiment 2 immediately before being assembled.

Further, the first insulator 24 in which the elastic member 27 is incorporated is disposed on the +Z direction side of the sheet type conductive member 21 as shown in FIG. 24. At this time, the first insulator 24 is positioned such that the spring members 26 of the elastic member 27 are situated on the +Z direction side of the corresponding openings 21C of the sheet type conductive member 21.

Figure 25:
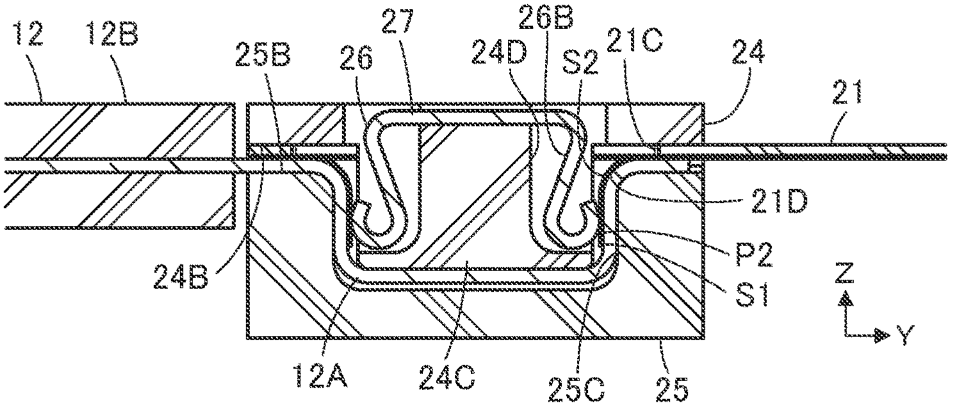
FIG. 25 is a cross-sectional view taken along line B-B in FIG. 15.

In this state, the first insulator 24 and the second insulator 25 are pressed against each other in the Z direction, whereby the protrusion portion 24C of the first insulator 24 is accommodated in the recess portion 25C of the second insulator 25 along the Z direction (second direction) as shown in FIG. 25.

The protrusion portion 24C of the first insulator 24 passes through the opening 21C of the sheet type conductive member 21 while pushing the conductor portion 12A drawn from the insulating coating portion 12B of the coated electric wire 12 and the pair of projection portions 21D of the sheet type conductive member 21, and is inserted into the recess portion 25C of the second insulator 25.

In addition, the sheet type conductive member 21 and the conductor portion 12A are sandwiched between the first retaining surface 24B of the first insulator 24 and the second retaining surface 25B of the second insulator 25.

The assembling operation of the connector is thus completed.

Since the pair of arm portions 26B of the spring member 26 of the elastic member 27 incorporated in the first insulator 24 are accommodated in the arm accommodating holes 24D formed on the opposite sides, in the Y direction, of the protrusion portion 24C of the first insulator 24, when the protrusion portion 24C of the first insulator 24 is inserted in the recess portion 25C of the second insulator 25, the conductor portion 12A of the coated electric wire 12 and the projection portions 21D of the sheet type conductive member 21 that have been pushed and inserted along with the protrusion portion 24C are bent along inner lateral surfaces of the recess portion 25C of the second insulator 25 and pressed against the inner lateral surfaces of the recess portion 25C by the pressing portions P2 of the spring member 26 on the opposite sides, in the Y direction, of the protrusion portion 24C. Since the projection portions 21D are formed from the insulating sheet S2 and the flexible conductor S1 stacked on the −Z direction side of the insulating sheet S2, the flexible conductor S1 of the projection portions 21D being bent makes contact with and is electrically connected to the conductor portion 12A of the coated electric wire 12 with a predetermined contact pressure.

Thus, also in the connector of Embodiment 2, the above configuration allows the connector to have a smaller size while improving the reliability of electric connection between the flexible conductor S1 and the conductor portion 12A, as with the connector of Embodiment 1.

Besides, elastic forces acting from the pressing portions P2 of the spring member 26 to the conductor portion 12A of the coated electric wire 12 and the projection portions 21D of the sheet type conductive member 21 are oriented in the Y direction (first direction) perpendicular to the Z direction (second direction) in which the protrusion portion 24C of the first insulator 24 is accommodated in the recess portion 25C of the second insulator 25, and further, oppositely-oriented elastic forces along the Y direction act from the pressing portions P2 of the spring member 26 on the opposite sides, in the Y direction, of the protrusion portion 24C. This makes it possible to obtain a stable electric connection.

In Embodiment 2, the pressing portions P2 of the spring member 26 make contact with the insulating sheet S2 of the projection portions 21D of the sheet type conductive member 21 and press the projection portions 21D and the conductor portion 12A of the coated electric wire 12 against the inner lateral surfaces of the recess portion 25C of the second insulator 25, and accordingly, the spring member 26 does not make direct contact with the flexible conductor S1 of the sheet type conductive member 21. Therefore, even using the elastic member 27 having the plurality of spring members 26 joined together, the plurality of flexible conductors S1 are prevented from short-circuiting therebetween, while the use of the elastic member 27 improves the workability in assembling the connector.

However, a plurality of spring members 26 separate from one another as in Embodiment 1 may be used in place of the elastic member 27.

Meanwhile, also in Embodiment 1, the pressing portions P1 of the spring member 16 make contact with the insulating sheet S2 of the projection portions 11D of the sheet type conductive member 11 and press the projection portions 11D and the conductor portion 12A of the coated electric wire 12 against the lateral surfaces of the protrusion portion 14C of the first insulator 14 as shown in FIG. 13; therefore, the workability in assembling the connector can be improved by using an elastic member having a plurality of the spring members 16 joined together as with Embodiment 2.

Embodiment 3

Figure 26:
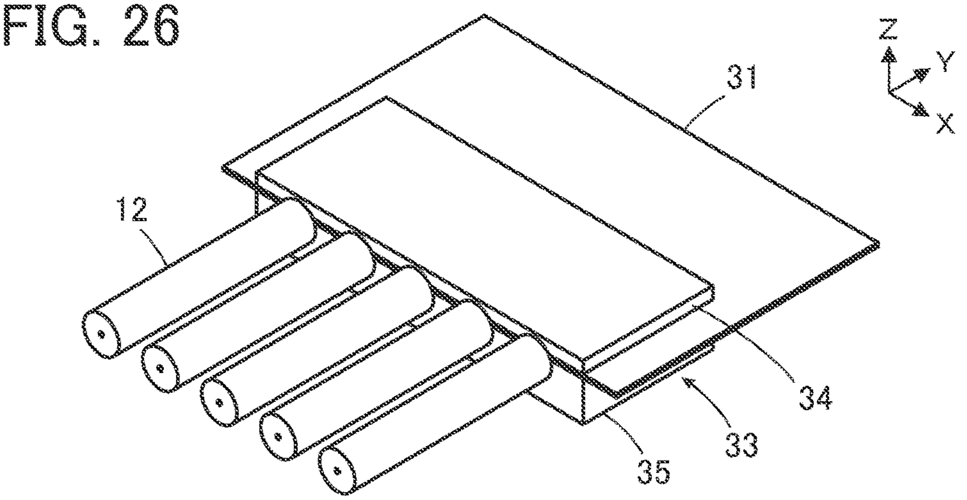
FIG. 26 is a perspective view showing a connector according to Embodiment 3.
Figure 27:
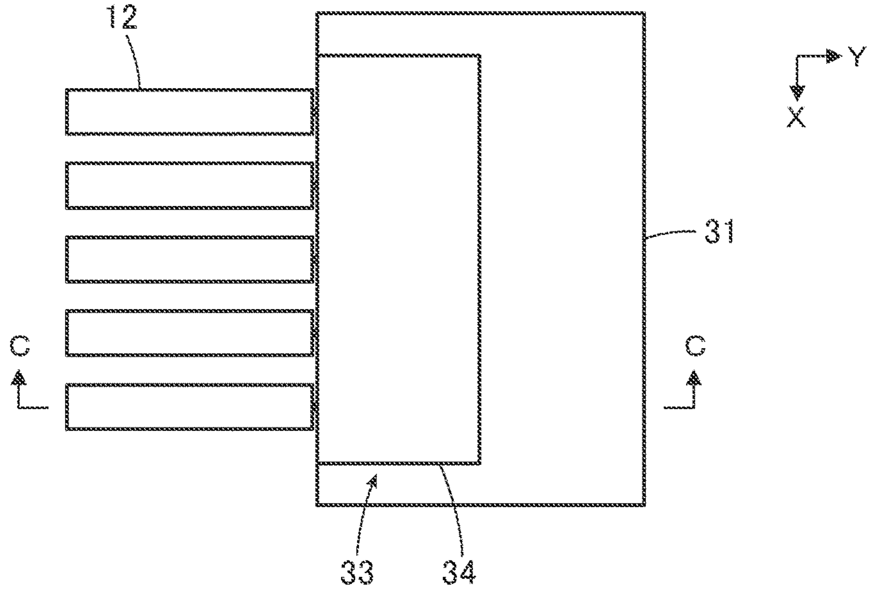
FIG. 27 is a plan view showing the connector according to Embodiment 3.

FIGS. 26 and 27 show a connector according to Embodiment 3. The connector is used for connecting the plurality of coated electric wires 12 to a sheet type conductive member 31 and includes a housing 33 made of an insulating resin material.

The coated electric wires 12 herein are the same as the coated electric wires 12 used in Embodiment 1.

The housing 33 is composed of a first insulator 34 and a second insulator 35. The first insulator 34 is disposed on the +Z direction side of the sheet type conductive member 31, and the second insulator 35 is disposed on the −Z direction side of the sheet type conductive member 31.

Figure 28:
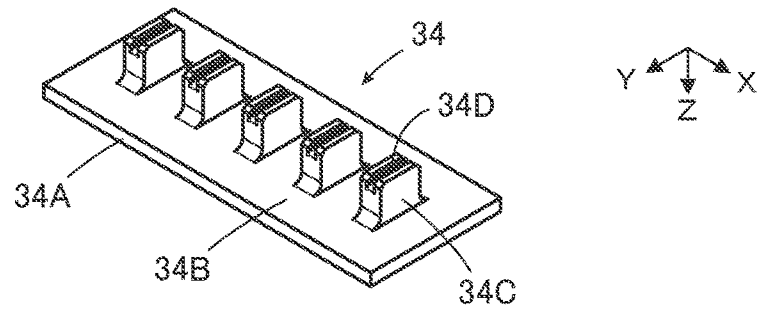
FIG. 28 is a perspective view showing the first insulator used in the connector according to Embodiment 3, as viewed from an obliquely lower position.

FIG. 28 shows the structure of the first insulator 34. The first insulator 34 includes a flat plate portion 34A of rectangular shape extending along an XY plane as with the first insulator 14 used in Embodiment 1. The top surface of the flat plate portion 34A on the −Z direction side forms a first retaining surface 34B, and a plurality of protrusion portions 34C in a prismatic shape are formed on the first retaining surface 34B to protrude in the −Z direction.

The protrusion portions 34C are aligned in the X direction at a predetermined pitch. Each protrusion portion 34C is provided at its top facing the −Z direction with an electric wire accommodating groove 34D traversing the protrusion portion 34C in the Y direction.

Figure 29:
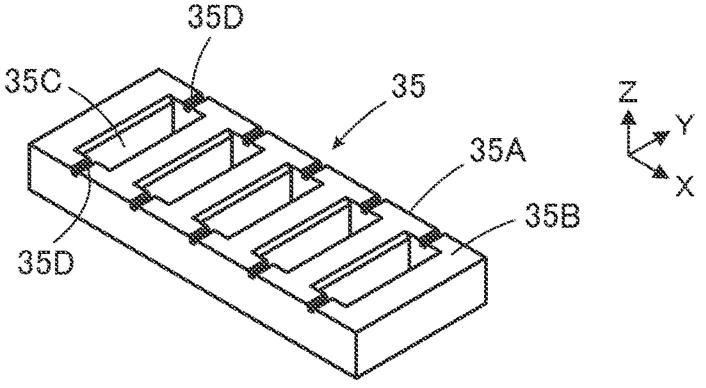
FIG. 29 is a perspective view showing a second insulator used in the connector according to Embodiment 3.

FIG. 29 shows the structure of the second insulator 35. The second insulator 35 includes a main body 35A in a rectangular, thick flat plate shape. The surface of the main body 35A on the +Z direction side forms a second retaining surface 35B. The main body 35A is provided with a plurality of rectangular through-holes 35C penetrating the main body 35A in the Z direction. The through-holes 35C constitute recess portions formed at the second retaining surface 35B. The through-holes 35C may be replaced by recess portions having bottom surfaces depressed toward the −Z direction from the second retaining surface 35B on the +Z direction side of the main body 35A.

The through-holes 35C are aligned in the X direction at the same pitch as that of the protrusion portions 34C of the first insulator 34. The second retaining surface 35B is provided with electric wire accommodating grooves 35D traversing the second retaining surface 35B in the Y direction on the opposite sides, in the Y direction, of each through-hole 35C.

Although not illustrated, press-fitting holes for retaining corresponding spring members 36 are formed separately at a pair of corners of each through-hole 35C on the −Z direction side, the pair of corners being situated on one diagonal line of each through-hole 35C.

Figure 30:
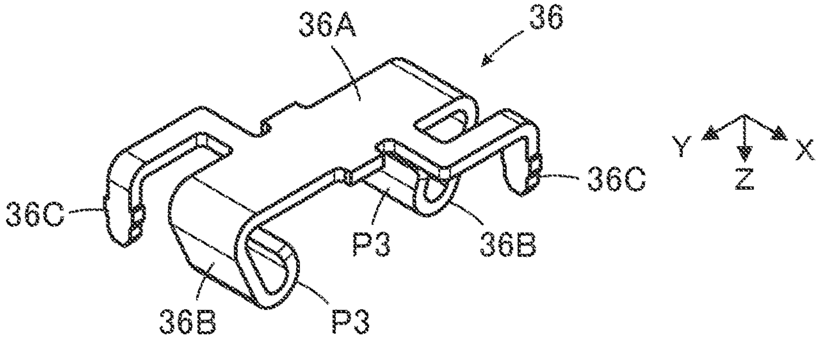
FIG. 30 is a perspective view of a spring member used in the connector according to Embodiment 3, as viewed from an obliquely lower position.

FIG. 30 shows the structure of a spring member 36. As with the spring member 16 used in Embodiment 1, the spring member 36 is formed from a bent metal plate and includes a flat plate portion 36A extending in the Y direction along an XY plane and a pair of arm portions 36B extending in the −Z direction separately from the opposite ends, in the Y direction, of the flat plate portion 36A. The −Z directional ends of the pair of arm portions 36B are curved inward to approach and face each other, and the curved portions of the pair of arm portions 36B form a pair of pressing portions P3 that are elastically displaceable in the Y direction (first direction).

The flat plate portion 36A is joined with a pair of press-fitting portions 36C that extend from the opposite edges, in the X direction, of the flat plate portion 36A up to positions adjacent to a pair of corners situated on one diagonal line of the flat plate portion 36A and that are bent toward the −Z direction.

When the spring member 36 is pushed into the corresponding through-hole 35C of the second insulator 35 from the −Z direction, the pair of press-fitting portions 36C of the spring member 36 are press-fitted into the pair of press-fitting holes (not shown) of the through-hole 35C, whereby the spring member 36 can be incorporated into the through-hole 35C.

Figure 31:
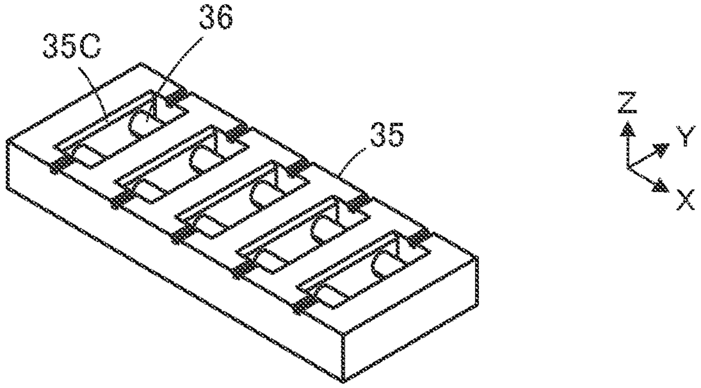
FIG. 31 is a perspective view showing the second insulator having spring members incorporated therein in Embodiment 3.

Thus, the plurality of spring members 36 are incorporated into the second insulator 35 as shown in FIG. 31.

Figure 32:
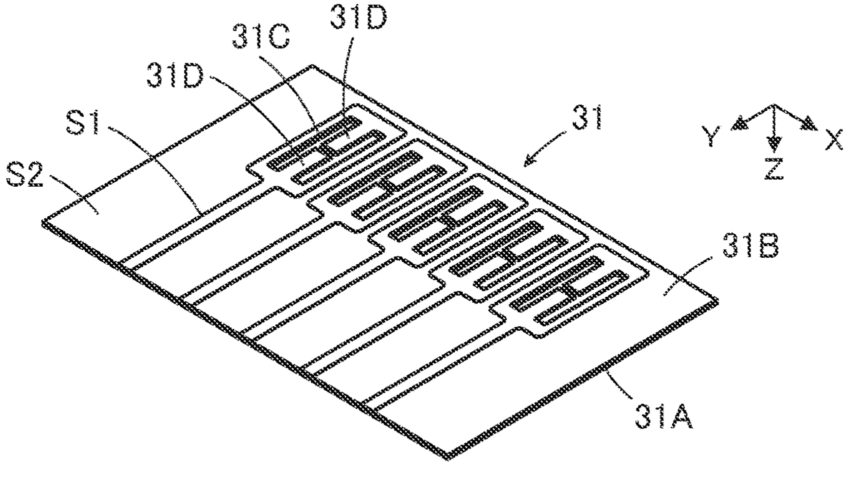
FIG. 32 is a perspective view of a sheet type conductive member used in the connector according to Embodiment 3, as viewed from an obliquely lower position.

FIG. 32 shows the structure of the sheet type conductive member 31. The sheet type conductive member 31 has a top surface 31A facing the +Z direction and a bottom surface 31B facing the −Z direction, and the flexible conductors S1 are exposed on the bottom surface 31B. The sheet type conductive member 31 is provided with a plurality of H-shaped openings 31C. A pair of projection portions 31D are formed to project from the opposite edges, in the Y direction, of each opening 31C toward the inside of the opening 31C and face each other in the Y direction.

The openings 31C are aligned in the X direction at the same pitch as that of the protrusion portions 34C of the first insulator 34 and the through-holes 35C of the second insulator 35.

As with the sheet type conductive member 11 used in Embodiment 1, the sheet type conductive member 31 has a three-layer structure in which the flexible conductor S1, the insulating sheet S2 retaining the flexible conductor S1, and the reinforcing plate S3 reinforcing the insulating sheet S2 are stacked in the Z direction as shown in FIG. 8.

Parts of the flexible conductor S1 are exposed on the pair of projection portions 31D on the bottom surface 31B, facing the −Z direction, of the sheet type conductive member 31 shown in FIG. 32, and those parts of the flexible conductor S1 of the pair of projection portions 31D are integral with another part of the flexible conductor S1 disposed along the periphery of the opening 31C and thereby electrically connected to each other.

On the bottom surface 31B of the sheet type conductive member 31, the insulating sheet S2 is exposed in the other regions than the regions where the flexible conductors S1 are exposed.

Figure 33:
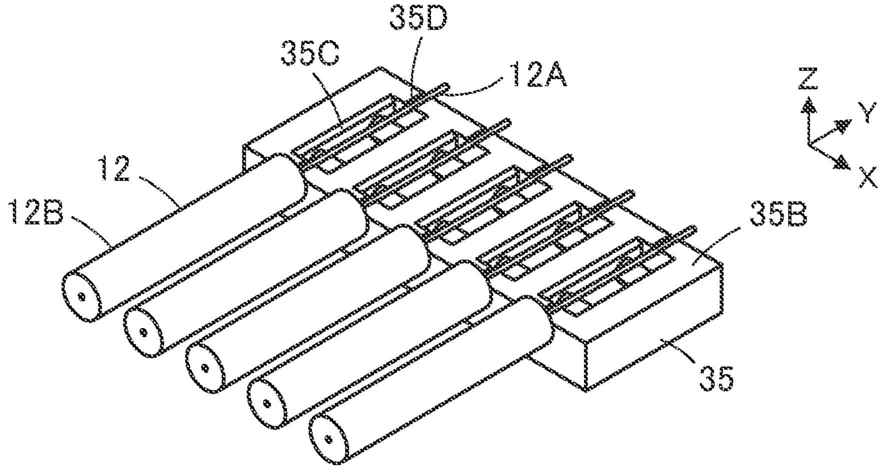
FIG. 33 is a perspective view showing the second insulator on which electric wires are disposed in Embodiment 3.

In assembly of the connector according to Embodiment 3, first, the conductor portions 12A drawn from the insulating coating portions 12B of the coated electric wires 12 are accommodated separately in the electric wire accommodating grooves 35D formed at the second retaining surface 35B on the opposite sides, in the Y direction, of the respective through-holes 35C of the second insulator 35 as shown in FIG. 33. At this time, intermediate portions of the conductor portions 12A are accommodated in the electric wire accommodating grooves 35D such that the tips of the respective conductor portions 12A protrude beyond the corresponding through-holes 35C on the +Y direction side, and the conductor portions 12A each traverse the +Z direction side of the corresponding through-hole 35C in the Y direction.

Figure 34:
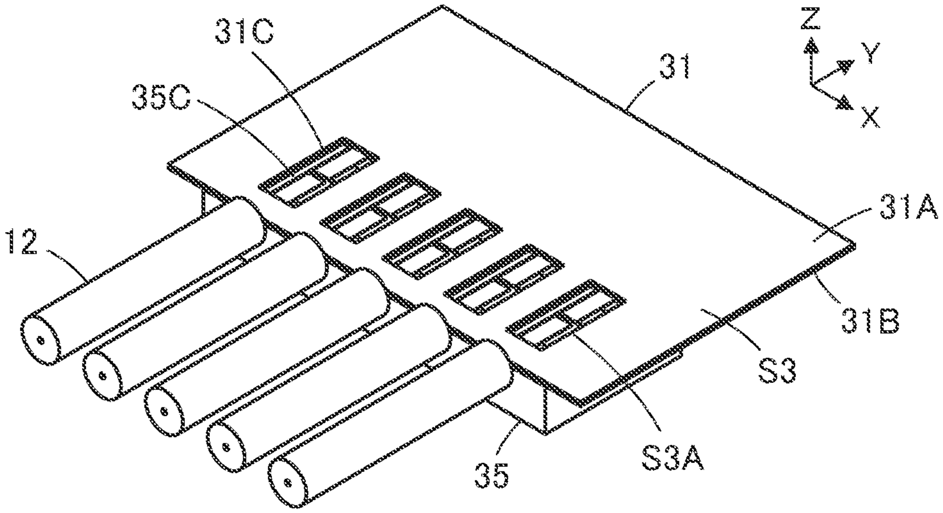
FIG. 34 is a perspective view showing the second insulator on which the electric wires and the sheet type conductive member are disposed in Embodiment 3.

Next, as shown in FIG. 34, the sheet type conductive member 31 is disposed on the second insulator 35 from the +Z direction. The sheet type conductive member 31 is positioned such that the bottom surface 31B on which the flexible conductors S1 are exposed faces the second insulator 35 and that the openings 31C overlap over the through-holes 35C of the second insulator 35. The reinforcing plate S3 is exposed on the top surface 31A, facing the +Z direction, of the sheet type conductive member 31. The reinforcing plate S3 is provided with a plurality of rectangular openings S3A corresponding to the H-shaped openings 31C.

Figure 35:
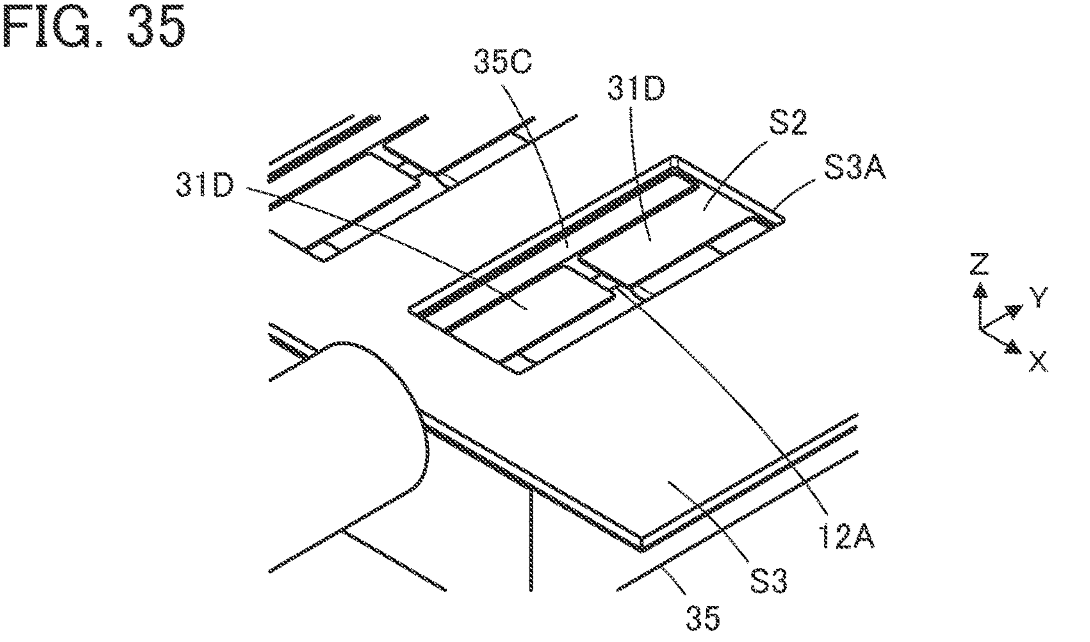
FIG. 35 is an enlarged view of a main part of FIG. 34.

As shown in FIG. 35, the pair of projection portions 31D extending in the Y direction and facing each other in the Y direction are seen within the opening S3A of the reinforcing plate S3. The projection portions 31D have a two-layer structure composed of the insulating sheet S2 and the flexible conductor S1 stacked on the −Z direction side of the insulating sheet S2 and make contact with the conductor portion 12A traversing the corresponding through-hole 35C of the second insulator 35 in the Y direction.

Figure 36:
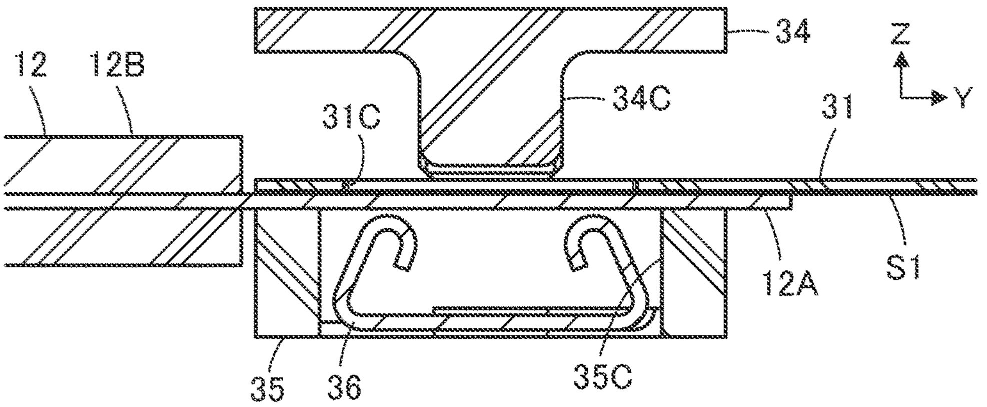
FIG. 36 is a cross-sectional view showing the connector according to Embodiment 3 immediately before being assembled.

Further, the first insulator 34 is disposed on the +Z direction side of the sheet type conductive member 31 as shown in FIG. 36. At this time, the first insulator 34 is positioned such that the protrusion portions 34C are situated on the +Z direction side of the corresponding openings 31C of the sheet type conductive member 31.

Figure 37:
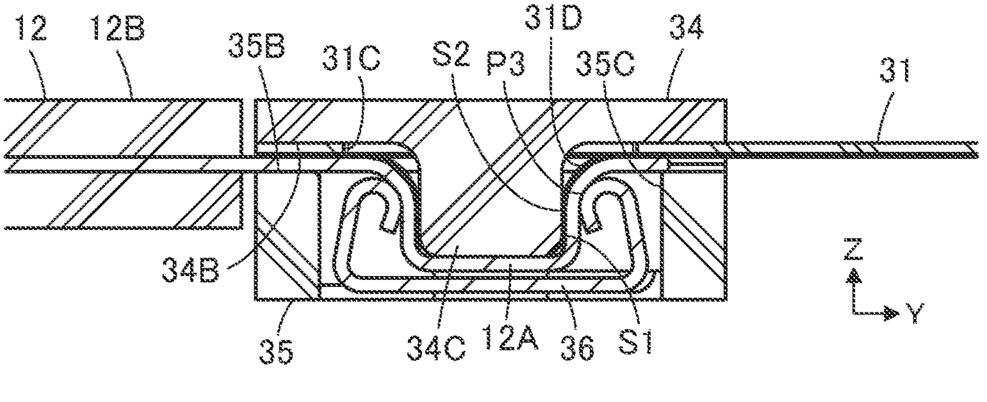
FIG. 37 is a cross-sectional view taken along line C-C in FIG. 27.

In this state, the first insulator 34 and the second insulator 35 are pressed against each other in the Z direction, whereby the protrusion portion 34C of the first insulator 34 is accommodated in the through-hole 35C of the second insulator 35 along the Z direction (second direction) as shown in FIG. 37.

Since the spring member 36 is incorporated in the through-hole 35C of the second insulator 35, the protrusion portion 34C of the first insulator 34 passes through the opening 31C of the sheet type conductive member 31 while pushing the pair of projection portions 31D of the sheet type conductive member 31 and the conductor portion 12A drawn from the insulating coating portion 12B of the coated electric wire 12, and is inserted between the pair of pressing portions P3 of the spring member 36.

In addition, the sheet type conductive member 31 and the conductor portion 12A are sandwiched between the first retaining surface 34B of the first insulator 34 and the second retaining surface 35B of the second insulator 35.

The assembling operation of the connector is thus completed.

By the protrusion portion 34C of the first insulator 34 being inserted between the pair of pressing portions P3 of the spring member 36 from the +Z direction, the projection portions 31D of the sheet type conductive member 31 and the conductor portion 12A of the coated electric wire 12 that have been pushed and inserted along with the protrusion portion 34C are bent along lateral surfaces of the protrusion portion 34C and pressed against the lateral surfaces of the protrusion portion 34C in the Y direction by the pressing portions P3 of the spring member 36 on the opposite sides, in the Y direction, of the protrusion portion 34C. Since the projection portions 31D are formed from the insulating sheet S2 and the flexible conductor S1 stacked on the −Z direction side of the insulating sheet S2, the flexible conductor S1 of the projection portions 31D being bent makes contact with and is electrically connected to the conductor portion 12A of the coated electric wire 12 with a predetermined contact pressure.

Thus, also in the connector of Embodiment 3, the above configuration allows the connector to have a smaller size while improving the reliability of electric connection between the flexible conductor S1 and the conductor portion 12A, as with the connectors of Embodiments 1 and 2.

Besides, elastic forces acting from the pressing portions P3 of the spring member 36 to the projection portions 31D of the sheet type conductive member 31 and the conductor portion 12A of the coated electric wire 12 are oriented in the Y direction (first direction) perpendicular to the Z direction (second direction) in which the protrusion portion 34C of the first insulator 34 is accommodated in the through-hole 35C of the second insulator 35, and further, oppositely-oriented elastic forces along the Y direction act from the pressing portions P3 of the spring member 36 on the opposite sides, in the Y direction, of the protrusion portion 34C. This makes it possible to obtain a stable electric connection.

Embodiment 4

Figure 38:
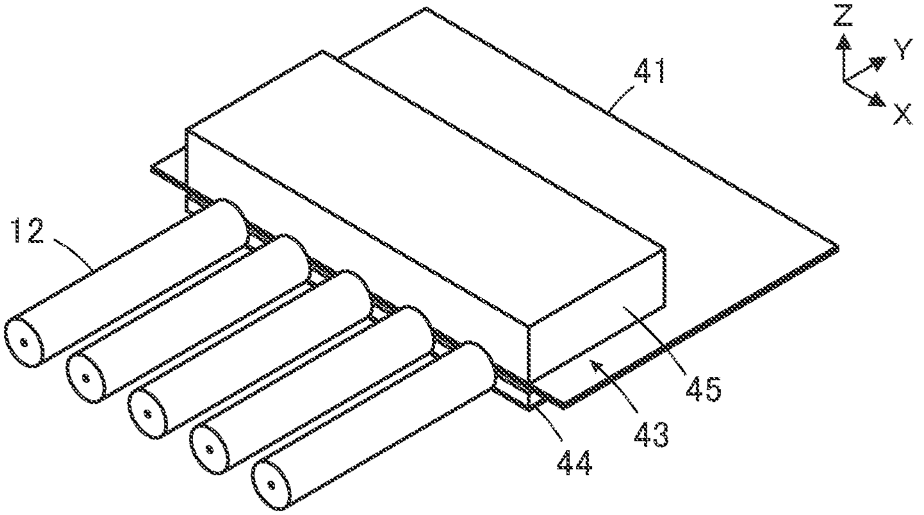
FIG. 38 is a perspective view showing a connector according to Embodiment 4.
Figure 39:
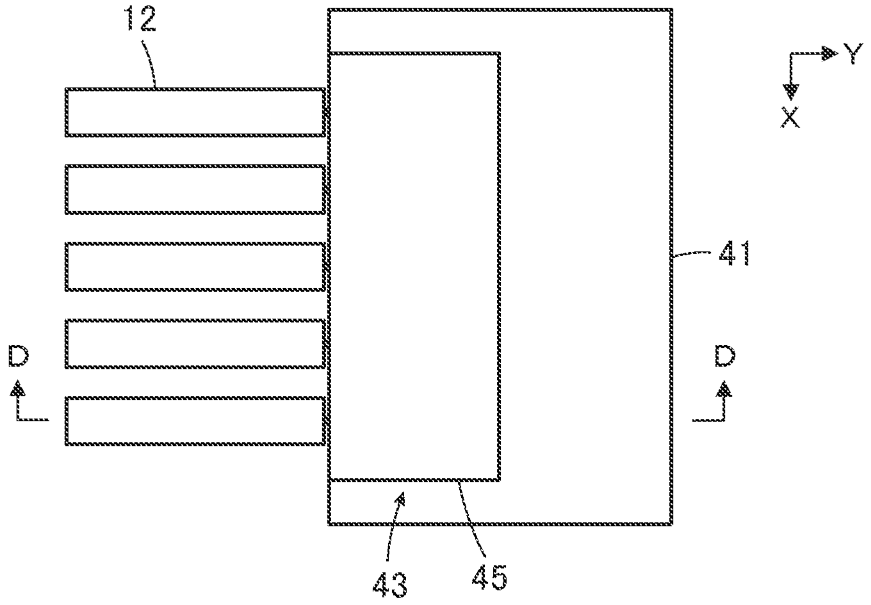
FIG. 39 is a plan view showing the connector according to Embodiment 4.

FIGS. 38 and 39 show a connector according to Embodiment 4. The connector is used for connecting the plurality of coated electric wires 12 to a sheet type conductive member 41 and includes a housing 43 made of an insulating resin material.

The coated electric wires 12 herein are the same as the coated electric wires 12 used in Embodiment 1.

The housing 43 is composed of a first insulator 44 and a second insulator 45. The second insulator 45 is disposed on the +Z direction side of the sheet type conductive member 41, and the first insulator 44 is disposed on the −Z direction side of the sheet type conductive member 41.

Figure 40:
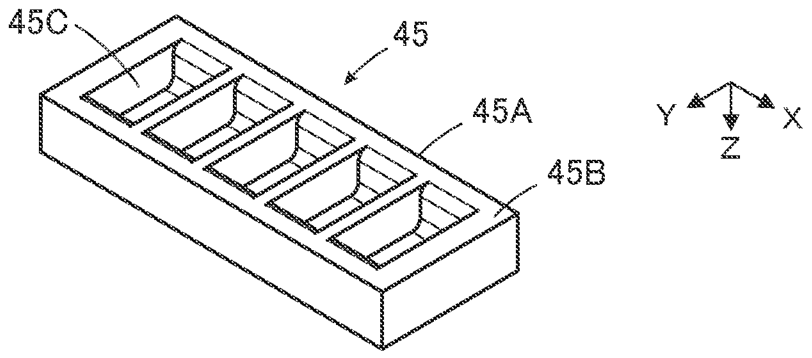
FIG. 40 is a perspective view of a second insulator used in the connector according to Embodiment 4, as viewed from an obliquely lower position.

FIG. 40 shows the structure of the second insulator 45. The second insulator 45 has a main body 45A in a rectangular, thick flat plate shape. The surface of the main body 45A on the −Z direction side forms a second retaining surface 45B. The main body 45A is provided with a plurality of rectangular recess portions 45C recessed in the +Z direction from the second retaining surface 45B. The recess portions 45C are aligned in the X direction at a predetermined pitch. The recess portions 45C may be replaced by through-holes penetrating the main body 45A in the Z direction from the second retaining surface 45B on the −Z direction side of the main body 45A to the opposite surface on the +Z direction side.

Figure 41:
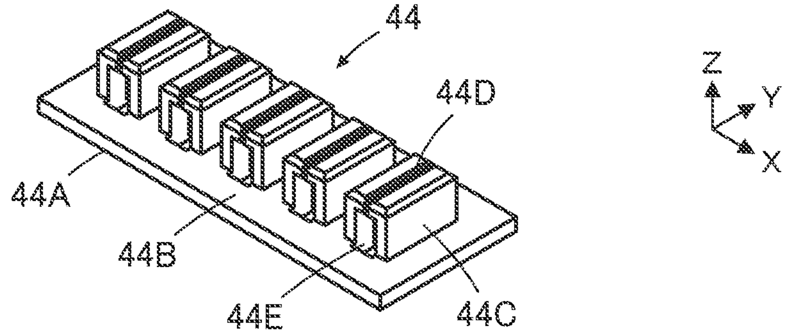
FIG. 41 is a perspective view showing a first insulator used in the connector according to Embodiment 4.

FIG. 41 shows the structure of the first insulator 44. The first insulator 44 has a rectangular flat plate portion 44A extending along an XY plane. The top surface of the flat plate portion 44A on the +Z direction side forms a first retaining surface 44B, and a plurality of protrusion portions 44C in a prismatic shape are formed on the first retaining surface 44B to protrude in the +Z direction.

The protrusion portions 44C are aligned in the X direction at the same pitch as that of the recess portions 45C of the second insulator 45. Each protrusion portion 44C is provided at its top facing the +Z direction with an electric wire accommodating groove 44D traversing the protrusion portion 44C in the Y direction.

Arm portion accommodating holes 44E are formed separately on the opposite sides, in the Y direction, of each protrusion portion 44C to penetrate the flat plate portion 44A in the Z direction from lateral portions of the protrusion portion 44C to the bottom surface of the flat plate portion 44A on the −Z direction side.

Figure 42:
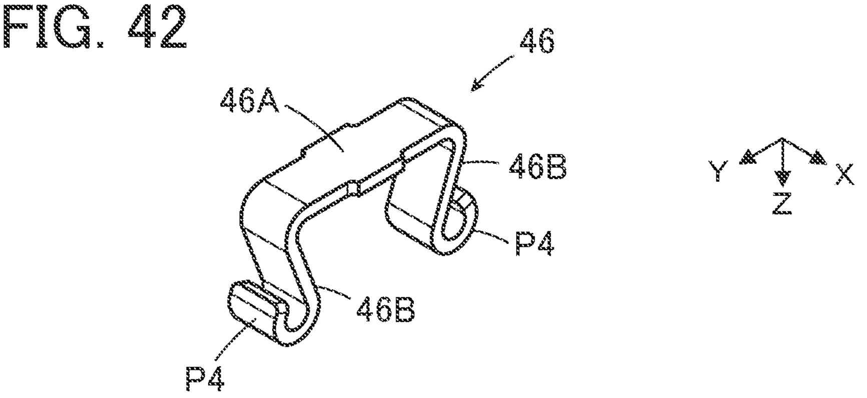
FIG. 42 is a perspective view of a spring member used in the connector according to Embodiment 4, as viewed from an obliquely lower position.

FIG. 42 shows the structure of a spring member 46. The spring member 46 is formed from a bent metal plate and includes a flat plate portion 46A extending in the Y direction along an XY plane and a pair of arm portions 46B extending in the +Z direction separately from the opposite ends, in the Y direction, of the flat plate portion 46A. The +Z directional ends of the pair of arm portions 46B are curved outward to face the opposite directions from each other. The curved portions of the pair of arm portions 46B form a pair of pressing portions P4 that are elastically displaceable in the Y direction (first direction).

When the spring member 46 is pushed toward the first insulator 44 from the −Z direction, the pair of arm portions 46B of the spring member 46 are accommodated separately into the arm portion accommodating holes 44E of the corresponding protrusion portion 44C of the first insulator 44, whereby the spring member 46 can be incorporated into the first insulator 44.

Figure 43:
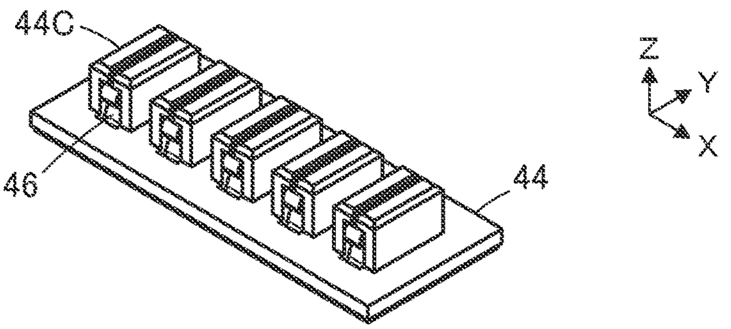
FIG. 43 is a perspective view showing the first insulator having spring members incorporated therein in Embodiment 4.

Thus, the plurality of spring members 46 are incorporated into the first insulator 44 as shown in FIG. 43. The spring member 46 can be retained in the first insulator 44 by attaching an adhesive film to be described later to the first insulator 44 from the −Z direction after the spring member 46 is pushed into the first insulator 44.

Figure 44:
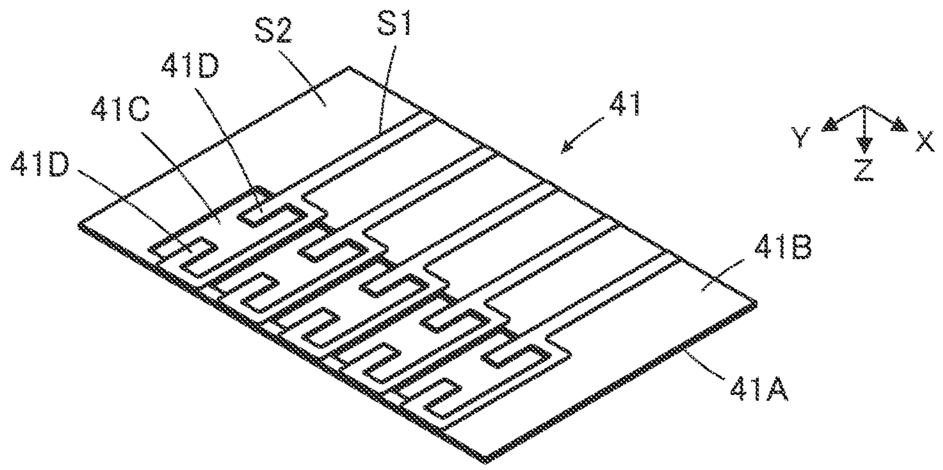
FIG. 44 is a perspective view of a sheet type conductive member used in the connector according to Embodiment 4, as viewed from an obliquely lower position.

FIG. 44 shows the structure of the sheet type conductive member 41. The sheet type conductive member 41 has a top surface 41A facing the +Z direction and a bottom surface 41B facing the −Z direction, and the flexible conductors S1 are exposed on the bottom surface 41B. The sheet type conductive member 41 is provided with a plurality of H-shaped openings 41C. A pair of projection portions 41D are formed to project from the opposite edges, in the Y direction, of each opening 41C toward the inside of the opening 41C and face each other in the Y direction.

The openings 41C are aligned in the X direction at the same pitch as that of the recess portions 45C of the second insulator 45 and the protrusion portions 44C of the first insulator 44.

As with the sheet type conductive member 11 used in Embodiment 1, the sheet type conductive member 41 has a three-layer structure in which the flexible conductor S1, the insulating sheet S2 retaining the flexible conductor S1, and the reinforcing plate S3 reinforcing the insulating sheet S2 are stacked in the Z direction as shown in FIG. 8.

Parts of the flexible conductor S1 are exposed on the pair of projection portions 41D on the bottom surface 41B, facing the −Z direction, of the sheet type conductive member 41 shown in FIG. 44, and those parts of the flexible conductor S1 of the pair of projection portions 41D are integral with another part of the flexible conductor S1 disposed along a lateral portion of the opening 41C and thereby electrically connected to each other.

On the bottom surface 41B of the sheet type conductive member 41, the insulating sheet S2 is exposed in the other regions than the regions where the flexible conductors S1 are exposed.

Figure 45:
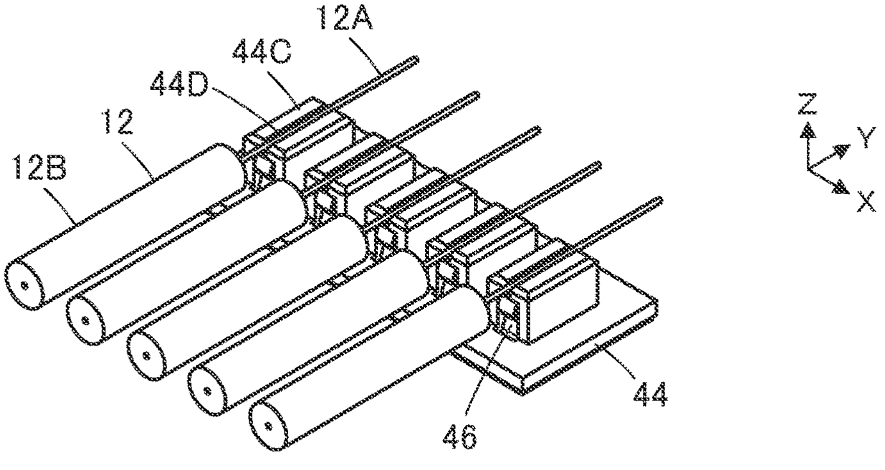
FIG. 45 is a perspective view showing the first insulator on which electric wires are disposed in Embodiment 4.

In assembly of the connector according to Embodiment 4, first, the conductor portions 12A drawn from the insulating coating portions 12B of the coated electric wires 12 are accommodated separately in the electric wire accommodating grooves 44D formed in the tops of the protrusion portions 44C of the first insulator 44 as shown in FIG. 45. At this time, intermediate portions of the conductor portions 12A are accommodated in the electric wire accommodating grooves 44D of the protrusion portions 44C such that the tips of the respective conductor portions 12A protrude beyond the corresponding protrusion portions 44C on the +Y direction side.

Figure 46:
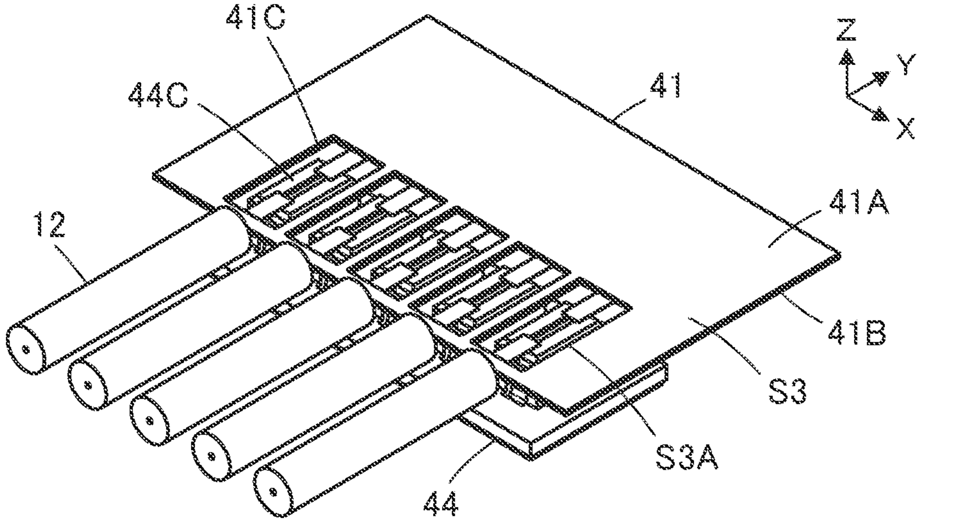
FIG. 46 is a perspective view showing the first insulator on which the electric wires and the sheet type conductive member are disposed in Embodiment 4.

Next, as shown in FIG. 46, the sheet type conductive member 41 is disposed on the first insulator 44 from the +Z direction. The sheet type conductive member 41 is positioned such that the bottom surface 41B on which the flexible conductors S1 are exposed faces the first insulator 44 and that the openings 41C overlap over the protrusion portions 44C of the first insulator 44. The reinforcing plate S3 is exposed on the top surface 41A, facing the +Z direction, of the sheet type conductive member 41. The reinforcing plate S3 is provided with a plurality of rectangular openings S3A corresponding to the H-shaped openings 41C.

Figure 47:
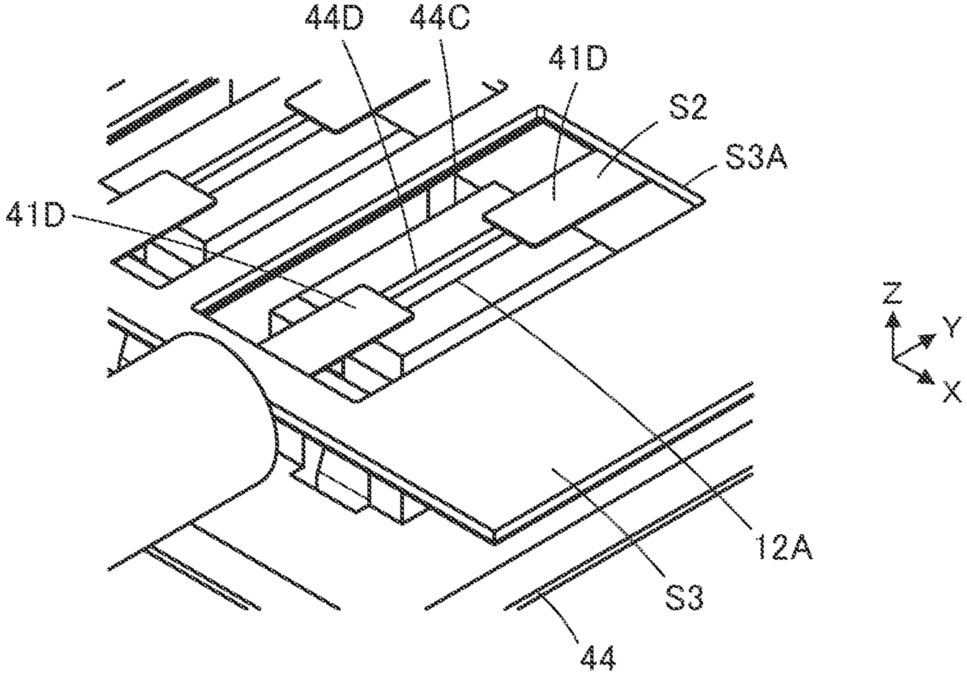
FIG. 47 is an enlarged view of a main part of FIG. 46.

As shown in FIG. 47, the pair of projection portions 41D extending in the Y direction and facing each other in the Y direction are seen within the opening S3A of the reinforcing plate S3. The projection portions 41D have a two-layer structure composed of the insulating sheet S2 and the flexible conductor S1 stacked on the −Z direction side of the insulating sheet S2 and make contact with the conductor portion 12A accommodated in the electric wire accommodating groove 44D of the corresponding protrusion portion 44C of the first insulator 44.

Figure 48:
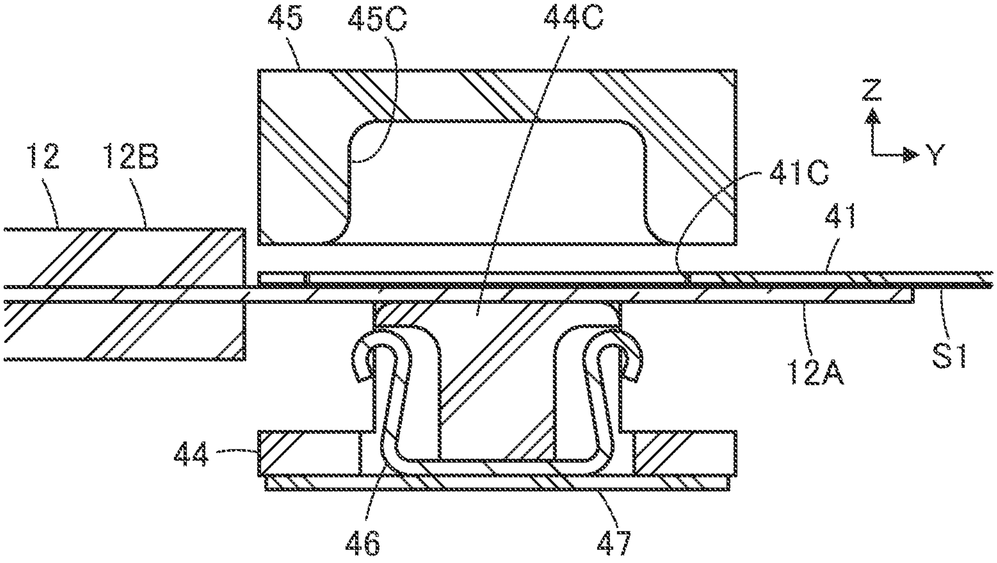
FIG. 48 is a cross-sectional view showing the connector according to Embodiment 4 immediately before being assembled.

Further, the second insulator 45 is disposed on the −Z direction side of the sheet type conductive member 41 as shown in FIG. 48. At this time, the second insulator 45 is positioned such that the recess portions 45C are situated on the +Z direction side of the corresponding openings 41C of the sheet type conductive member 41.

The spring members 46 incorporated in the first insulator 44 are retained in the first insulator 44 by an adhesive film 47 attached to the surface of the first insulator 44 on the −Z direction side.

Figure 49:
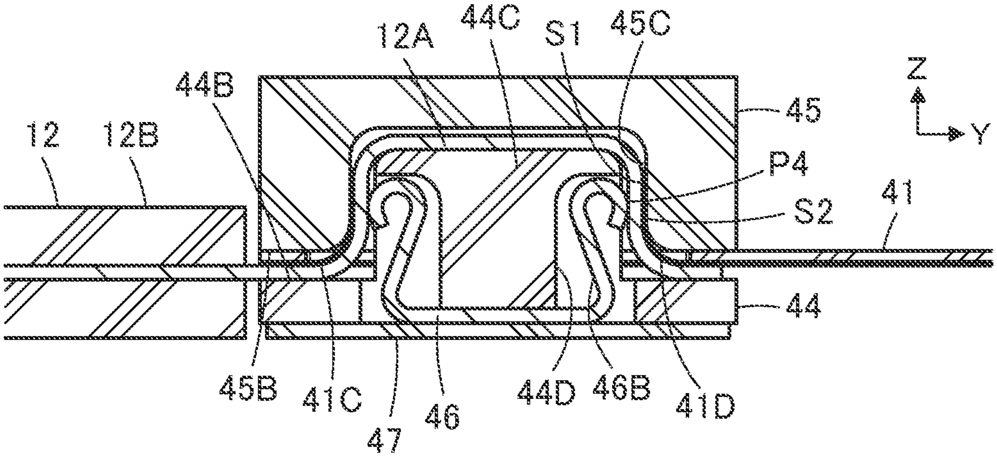
FIG. 49 is a cross-sectional view taken along line D-D in FIG. 39.
Figure 50:
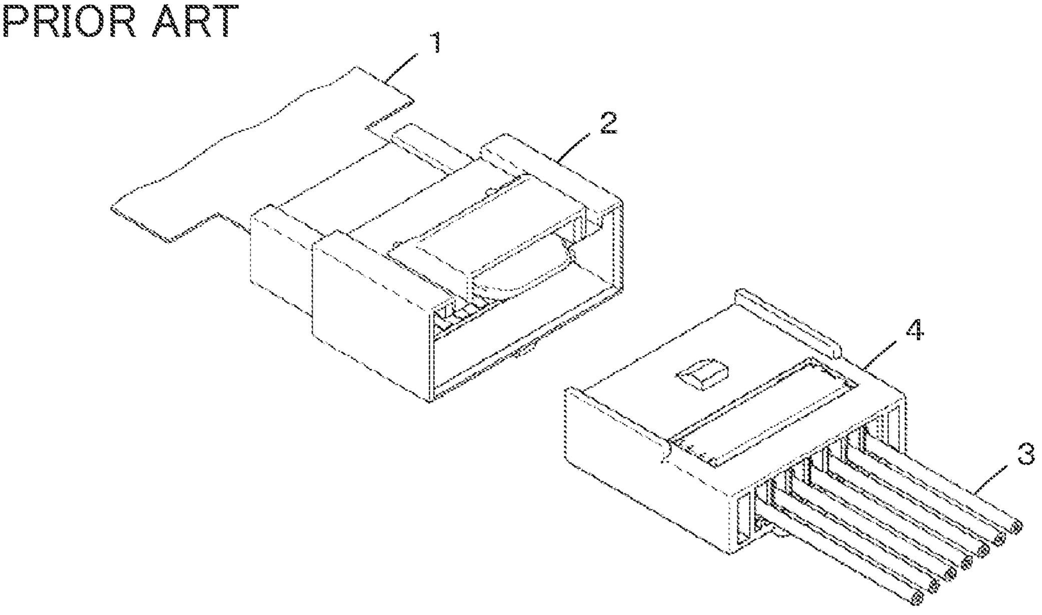
FIG. 50 PRIOR ART
FIG. 50 is a perspective view showing a conventional connector.

In this state, the first insulator 44 and the second insulator 45 are pressed against each other in the Z direction, whereby the protrusion portion 44C of the first insulator 44 is accommodated in the recess portion 45C of the second insulator 45 along the Z direction (second direction) as shown in FIG. 49.

The protrusion portion 44C of the first insulator 44 passes through the opening 41C of the sheet type conductive member 41 while pushing the conductor portion 12A drawn from the insulating coating portion 12B of the coated electric wire 12 and the pair of projection portions 41D of the sheet type conductive member 41, and is inserted into the recess portion 45C of the second insulator 45.

In addition, the sheet type conductive member 41 and the conductor portion 12A are sandwiched between the first retaining surface 44B of the first insulator 44 and the second retaining surface 45B of the second insulator 45.

The assembling operation of the connector is thus completed.

Since the pair of arm portions 46B of the spring member 46 incorporated in the first insulator 44 are accommodated in the arm accommodating holes 44E formed separately on the opposite sides, in the Y direction, of the protrusion portion 44C of the first insulator 44, when the protrusion portion 44C of the first insulator 44 is inserted in the recess portion 45C of the second insulator 45, the conductor portion 12A of the coated electric wire 12 and the projection portions 41D of the sheet type conductive member 41 that have been pushed and inserted along with the protrusion portion 44C are bent along inner lateral surfaces of the recess portion 45C of the second insulator 45 and pressed against the inner lateral surfaces of the recess portion 45C by the pressing portions P4 of the spring member 46 on the opposite sides, in the Y direction, of the protrusion portion 44C. Since the projection portions 41D are formed from the insulating sheet S2 and the flexible conductor S1 stacked on the −Z direction side of the insulating sheet S2, the flexible conductor S1 of the projection portions 41D being bent makes contact with and is electrically connected to the conductor portion 12A of the coated electric wire 12 with a predetermined contact pressure.

Thus, also in the connector of Embodiment 4, the above configuration allows the connector to have a smaller size while improving the reliability of electric connection between the flexible conductor S1 and the conductor portion 12A, as with the connectors of Embodiments 1 to 3.

Besides, elastic forces acting from the pressing portions P4 of the spring member 46 to the conductor portion 12A of the coated electric wire 12 and the projection portions 41D of the sheet type conductive member 41 are oriented in the Y direction (first direction) perpendicular to the Z direction (second direction) in which the protrusion portion 44C of the first insulator 44 is accommodated in the recess portion 45C of the second insulator 45, and further, oppositely-oriented elastic forces along the Y direction act from the pressing portions P4 of the spring member 46 on the opposite sides, in the Y direction, of the protrusion portion 44C. This makes it possible to obtain a stable electric connection.

While the five coated electric wires 12 are connected to the sheet type conductive member 11, 21, 31, 41 in Embodiments 1 to 4 illustrated, the number of the coated electric wires 12 is not limited to five, and the conductor portion(s) 12A of one or more coated electric wires 12 may be connected to the flexible conductor(s) S1.

While the coated electric wire 12 is used as an electric wire connected to the sheet type conductive member 11, 21, 31, 41, an electric wire constituted only of the conductor portion 12A whose outer periphery is not covered with the insulating coating portion 12B formed from an insulator may be connected to the sheet type conductive member 11, 21, 31, 41.

The sheet type conductive member 11, 21, 31, 41 has the reinforcing plate S3 reinforcing the insulating sheet S2 on which the flexible conductor S1 is retained as shown in FIG. 8, thus resulting in excellent handleability and making it possible to assemble the connector with good workability.

However, when the handleability of the sheet type conductive member 11, 21, 31, 41 is not required, the reinforcing plate S3 may be omitted such that the sheet type conductive member 11, 21, 31, 41 has a two-layer structure composed of the flexible conductor S1 and the insulating sheet S2.

What is claimed is:

1. A connector connecting a conductor portion of an electric wire to a flexible conductor exposed on at least one surface of a sheet type conductive member, the connector comprising:

a first insulator including a first retaining surface and a protrusion portion formed on the first retaining surface to protrude;

a second insulator including a second retaining surface that faces the first retaining surface and a recess portion that is formed at the second retaining surface and corresponds to the protrusion portion; and a spring member retained in one of the first insulator and the second insulator, wherein the spring member is disposed between the protrusion portion and the recess portion and has a pressing portion that is elastically displaceable in a first direction along the first retaining surface and the second retaining surface, the sheet type conductive member and the electric wire are sandwiched between the first retaining surface and the second retaining surface, and at least a part of the protrusion portion is accommodated in the recess portion, and the conductor portion of the electric wire and the flexible conductor of the sheet type conductive member are pressed against each other in the first direction by the pressing portion within the recess portion, so that the conductor portion of the electric wire is electrically connected to the flexible conductor of the sheet type conductive member, wherein the spring member has a pair of the pressing portions each of which is disposed between a lateral surface of the protrusion portion and an inner lateral surface of the recess portion on each of opposite sides of the protrusion portion in the first direction, the lateral surface and the inner lateral surface facing each other in the first direction, and the conductor portion of the electric wire and the flexible conductor of the sheet type conductive member are pressed against each other in the first direction by the pair of the pressing portions on the opposite sides of the protrusion portion in the first direction, wherein the spring member is retained in the second insulator, and the pair of the pressing portions each press the conductor portion of the electric wire and the flexible conductor of the sheet type conductive member against the lateral surface of the protrusion portion on each of the opposite sides of the protrusion portion in the first direction.

2. The connector according to claim 1, wherein the spring member is retained in the first insulator, and the pair of the pressing portions each press the conductor portion of the electric wire and the flexible conductor of the sheet type conductive member against the inner lateral surface of the recess portion on each of the opposite sides of the protrusion portion in the first direction.

3. The connector according to claim 1, wherein the first insulator includes an electric wire accommodating groove provided at a top of the protrusion portion and extending in the first direction to accommodate the conductor portion of the electric wire.

4. The connector according to claim 1, wherein the second insulator includes an electric wire accommodating groove provided at the second retaining surface and extending in the first direction to accommodate the conductor portion of the electric wire.

5. The connector according to claim 1, wherein the protrusion portion has a prismatic shape.

6. The connector according to claim 1, wherein the spring member is retained in one of the first insulator and the second insulator by press-fitting.

7. The connector according to claim 1, wherein the spring member is retained in one of the first insulator and the second insulator by an adhesive film.

8. A connector assembly comprising:

the sheet type conductive member;

the electric wire; and the connector according to claim 1 connected to the sheet type conductive member and the electric wire, wherein the sheet type conductive member includes an opening through which the protrusion portion of the first insulator passes and a projection portion projecting from an edge of the opening toward an inside of the opening, the flexible conductor being exposed on the projection portion, and the projection portion and the conductor portion of the electric wire are pressed against each other in the first direction by the pressing portion within the recess portion.

9. The connector according to claim 1, wherein the at least a part of the protrusion portion is accommodated in the recess portion along a second direction perpendicular to the first retaining surface and the second retaining surface.

10. The connector according to claim 9, wherein the spring member is formed from a bent metal plate and includes a flat plate portion that is parallel to the first retaining surface and the second retaining surface and extends along the first direction and a pair of arm portions that extend in the second direction separately from opposite ends of the flat plate portion in the first direction, and the pair of the pressing portions are disposed separately at tips of the pair of arm portions.

11. The connector according to claim 1, wherein the first insulator includes a plurality of the protrusion portions aligned in an alignment direction perpendicular to the first direction on the first retaining surface, the second insulator includes a plurality of the recess portions aligned in the alignment direction on the second retaining surface, and the conductor portions of a plurality of the electric wires aligned in the alignment direction are electrically connected to a plurality of the flexible conductors of the sheet type conductive member.

12. The connector according to claim 11, comprising a plurality of the spring members aligned in the alignment direction.

13. The connector according to claim 12, wherein the plurality of the spring members are joined together.

* * * * *